US010452370B2

(12) United States Patent
Davidson et al.

(10) Patent No.: US 10,452,370 B2
(45) Date of Patent: Oct. 22, 2019

(54) SYSTEM, METHOD AND COMPUTER READABLE MEDIUM FOR SPACE-EFFICIENT BINARY REWRITING

(71) Applicants: UNIVERSITY OF VIRGINIA PATENT FOUNDATION, Charlottesville, VA (US); Jack W. Davidson, Charlottesville, VA (US); Clark Lynch Coleman, Charlottesville, VA (US)

(72) Inventors: Jack W. Davidson, Charlottesville, VA (US); Clark Lynch Coleman, Charlottesville, VA (US); Jason D. Hiser, Charlottesville, VA (US); Anh Nguyen-Tuong, Charlottesville, VA (US)

(73) Assignee: UNIVERSITY OF VIRGINIA PATENT FOUNDATION, Charlottesville, VA (US)

( * ) Notice: Subject to any disclaimer, the term of this patent is extended or adjusted under 35 U.S.C. 154(b) by 0 days.

(21) Appl. No.: 15/542,214

(22) PCT Filed: Jan. 8, 2016

(86) PCT No.: PCT/US2016/012713
§ 371 (c)(1),
(2) Date: Jul. 7, 2017

(87) PCT Pub. No.: WO2016/112330
PCT Pub. Date: Jul. 14, 2016

(65) Prior Publication Data
US 2017/0371635 A1    Dec. 28, 2017

Related U.S. Application Data

(60) Provisional application No. 62/101,929, filed on Jan. 9, 2015, provisional application No. 62/200,324, filed on Aug. 3, 2015.

(51) Int. Cl.
*G06F 8/52* (2018.01)
*G06F 8/53* (2018.01)
*G06F 8/41* (2018.01)

(52) U.S. Cl.
CPC ................ *G06F 8/52* (2013.01); *G06F 8/53* (2013.01); *G06F 8/44* (2013.01); *G06F 8/48* (2013.01)

(58) Field of Classification Search
CPC ..... G06F 8/30; G06F 8/41; G06F 8/51; G06F 8/52; G06F 9/45516; G06F 8/53; G06F 8/44; G06F 8/48
(Continued)

(56) References Cited

U.S. PATENT DOCUMENTS 6,081,665 A * 6/2000 Nilsen ................ G06F 9/45504
717/116
6,941,545 B1 * 9/2005 Reese ................ G06F 9/45554
711/206
(Continued)

FOREIGN PATENT DOCUMENTS

WO    2007/008919 A2    1/2007
WO    2009/108245 A2    9/2009
(Continued)

OTHER PUBLICATIONS

Notification of Transmittal of the International Search Report and the Written Opinion of the International Searching Authority, or Declaration (Form PCT/ISA/220) issued in counterpart International Application No. PCT/US2016/012713 dated May 23, 2016, with Forms PCT/ISA/210 and PCT/ISA/237 (9 pages).

*Primary Examiner* — Marina Lee
(74) *Attorney, Agent, or Firm* — Westerman, Hattori, Daniels & Adrian, LLP

(57) ABSTRACT

According to some illustrative embodiments of the invention, a method is performed that includes using a represen-
(Continued)

tation of a computer software program, using identified addresses which correspond to a part of the representation, and converting the representation into a created binary program, which includes reserving spaces at the identified addresses in the created binary program's address space at the same addresses as the identified addresses in the representation.

24 Claims, 14 Drawing Sheets

(58) Field of Classification Search
USPC .................................................. 717/120–140
See application file for complete search history.

(56) References Cited

U.S. PATENT DOCUMENTS

| | | | | |
|---|---|---|---|---|
| 8,001,535 | B2* | 8/2011 | Brown | G06F 9/45504 717/138 |
| 8,510,723 | B2 | 8/2013 | Barua et al. | |
| 8,522,225 | B2* | 8/2013 | Chen | G06F 8/433 717/133 |
| 9,448,788 | B1* | 9/2016 | Barua | G06F 8/70 |
| 9,880,842 | B2* | 1/2018 | Bobba | G06F 9/3005 |
| 10,193,927 | B2* | 1/2019 | Hiser | G06F 21/56 |
| 2009/0144561 | A1 | 6/2009 | Davidson et al. | |
| 2010/0306746 | A1* | 12/2010 | Barua | G06F 8/52 717/136 |
| 2011/0035601 | A1 | 2/2011 | Davidson et al. | |
| 2011/0219208 | A1* | 9/2011 | Asaad | G06F 15/76 712/12 |
| 2011/0321021 | A1* | 12/2011 | Chen | G06F 8/4442 717/157 |
| 2012/0198169 | A1 | 8/2012 | Chen et al. | |
| 2014/0189330 | A1* | 7/2014 | Zaks | G06F 8/4441 712/239 |
| 2014/0281424 | A1* | 9/2014 | Bobba | G06F 9/3005 712/225 |
| 2015/0106872 | A1 | 4/2015 | Hiser et al. | |
| 2017/0371635 | A1* | 12/2017 | Davidson | G06F 8/52 |

FOREIGN PATENT DOCUMENTS

| | | |
|---|---|---|
| WO | 2013/130548 A2 | 9/2013 |
| WO | 2014/078585 A2 | 5/2014 |

* cited by examiner

Figure 1: High level Zipr Process

Figure 2: Splitting a dollop.

Figure 3: Sample address space after pinned data and instructions are marked.

Figure 4: Address space with one resolved dollop.

Figure 5: Example of splitting a dollop.

Figure 6: Pinned address dollop resolution

Figure 7: Dollop selection choices.

Figure 8: Zipr file size increase for x86-32 architecture.

Figure 9: Zipr file size increase for x86-64 architecture.

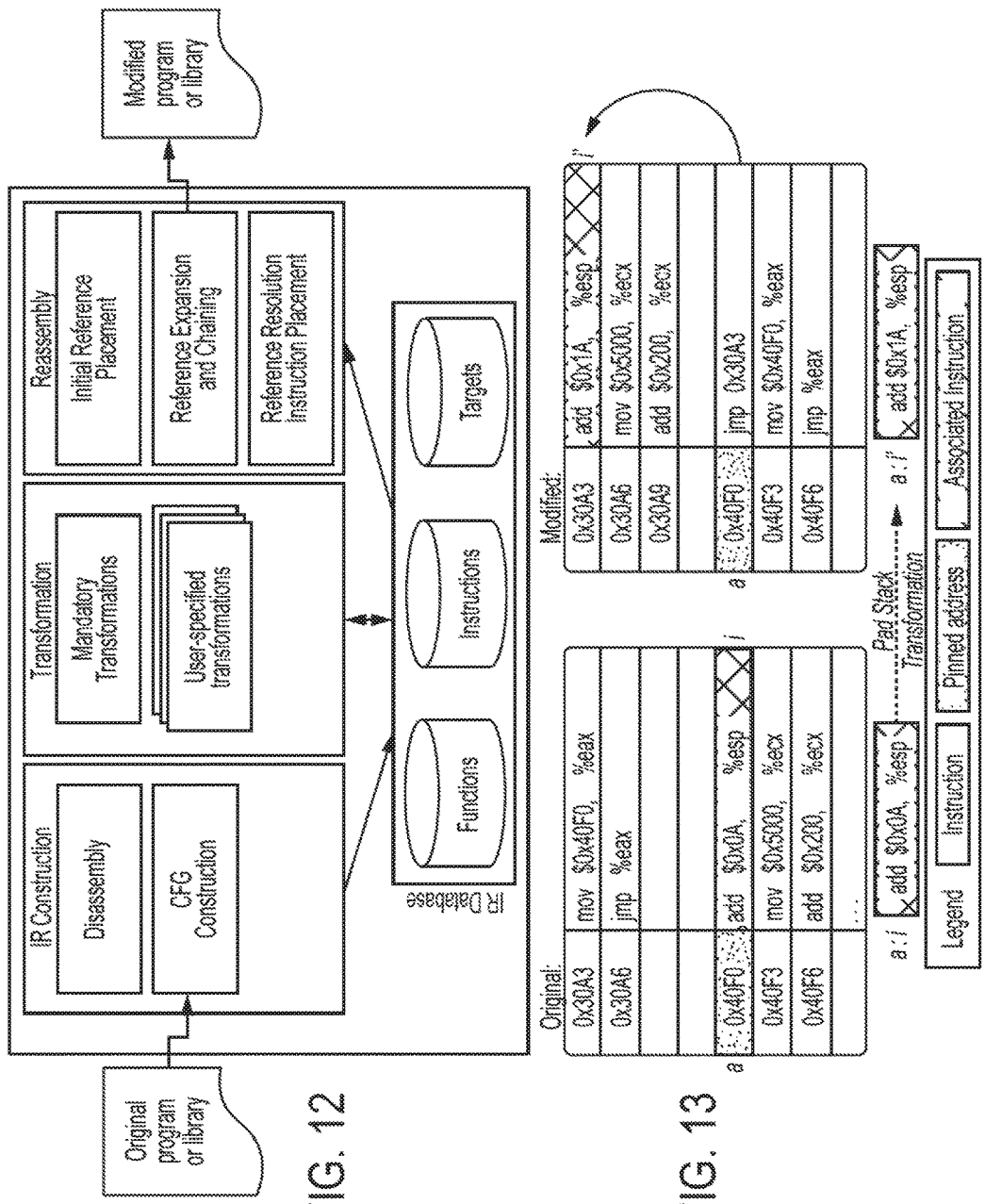

SYSTEM, METHOD AND COMPUTER READABLE MEDIUM FOR SPACE-EFFICIENT BINARY REWRITING

This invention was made with government support under W31P4Q-14-C-0086 awarded by Defense Advanced Research Projects Agency. The government has certain rights in the invention.

FIELD OF THE INVENTION

The present invention relates generally to, e.g., the field of static binary rewriters having minimal space and time overhead.

BACKGROUND

Binary rewriters accept a binary executable program as input, and produce an improved executable as output. The output executable usually has the same functionality as the input, but has improved functionality, such as run time, energy use, memory use, security, or reliability.

There are many existing static binary rewriters, such as SecondWrite, Etch, Vulcan, DIABLO, REINS, and PSI. Many static rewriters require additional program information to operate correctly (such as source code, object code, or other compiler artifacts), which may not be available for legacy software. Most static rewriters keep an original copy of the program's code as a hedge against failure when they cannot correctly disambiguate code from data. Others cause significant performance degradation. These space and time overheads can make a rewriter unsuitable for servers and embedded systems.

For example, Barua, et al. (U.S. Pat. No. 8,510,723) discloses a static binary rewriter that is able to rewrite without relocation information. However, the Barua, et al. methodology has difficult rewriting binary files that include indirect control transfers and therefore must provide a hedge that sacrifices the size of the new binary by keeping an image of the original binary in the new binary, which more than doubles the size of the new binary compared to the original binary. Other static binary rewriters have similar issues and also must include the original binary with the new binary, which again, comes at the cost of having to have a disk size that is at least twice as large for the new binary as compared to the original binary. See, for example: (1) Richard Wartell, Vishwath Mohan, Kevin W. Hamlen, and Zhiqiang Lin, 2012, Securing untrusted code via compiler-agnostic binary rewriting, Proceedings of the 28th Annual Computer Security Applications Conference (ACSAC '12), ACM, New York, N.Y., USA, 299-308, http://dx.doi.org/10.1145/2420950.2420995; (2) P. O'Sullivan, K. Anand, A. Kotha, M. Smithson, R. Barua, and A. D. Keromytis, Retrofitting security in COTS software with binary rewriting, Proc. Int. Information Security Conf., pages 154-172, 2011; and (3) Mingwei Zhang, Rui Qiao, Niranjan Hasabnis, and R. Sekar, A platform for secure static binary instrumentation, in Proceedings of the 10th ACM SIGPLAN/SIGOPS international conference on Virtual execution environments (VEE 2014), ACM, New York, N.Y., USA, 129-140, http://dx.doi.org/10.1145/2576195.2576208.

Recently, there has been tremendous growth in the emerging category called the Internet of Things (IoT), which refers to everyday objects, such as, e.g., thermostats, refrigerators, locks, etc., that are "smart." That is, each of the devices is able to execute dedicated computer programs stored in the memory included in the device, which enables these everyday devices to perform certain functions and communication accordingly via the Internet or other networks.

Sometimes, it becomes necessary to enhance or modify the programs stored in these smart devices by using a static binary rewriter. However, the prior art systems, such as, e.g., that disclosed by Barua, et al. (U.S. Pat. No. 8,510,723) discussed above, require a disk space that is at least twice as large for a new binary file as the original binary file, since they have difficulty rewriting binary files that include indirect control transfers. Unfortunately, it is simply not feasible to require each of these everyday ubiquitous devices to meet such storage requirements.

Accordingly, there is an existing need for a static binary rewriter that is able to rewrite binary files that include indirect control transfers while at the same time have low size and performance overheads.

SUMMARY OF THE PREFERRED EMBODIMENTS

To address this flaw and other problems, the present invention provides a revolutionary new static binary rewriting technology that produces new binaries that are efficient in both space and time.

According to some illustrative embodiments of the invention, a method is performed that includes: using a representation of a computer software program; using identified addresses which correspond to a part of the representation; and converting the representation into a created binary program, which includes reserving spaces at the identified addresses in the created binary program's address space at the same addresses as the identified addresses in the representation.

According to some examples, wherein the identified addresses are addresses of indirect branch targets.

According to some examples, the identified addresses are an approximation of indirect branch targets.

According to some examples, the representation is created by analyzing a computer software program.

According to some examples, the analyzing is disassembling a computer software program.

According to some examples, the identified addresses are generated by analyzing a computer software program or the representation of a computer software program.

According to some examples, the analyzing includes scanning for indirect branch targets.

According to some examples, the representation is modified by applying a transformation of the representation that modifies the representation.

According to some examples, the space reserved is used to transfer control to the corresponding part of the representation.

According to some examples, the space reserved is used to directly represent the corresponding part of the representation.

According to some examples, a portion or all of the data of the computer software program is included in the created binary program.

According to some examples, the created binary program does not include at least a portion of a copy of code from another analyzed binary program.

According to some examples, the created binary program does not include an entire copy of code from another analyzed binary program.

According to some examples, the space is reserved at all of the identified addresses.

According to some examples, the space is reserved at only some of the identified addresses.

According to some examples, another method is used for rewriting some indirect branches or indirect branch targets.

According to some examples, space reserved from spatially nearby identified addresses is coalesced.

According to some examples, the space reserved is used to put a sequence of bytes, where each address in the coalesced reserved space, when executed by a processor, will cause machine state to be different than if a different address executed.

According to some examples, the differences in machine state are predictable to the system that produces the created binary program.

According to some examples, machine state differences are used to execute the corresponding part of the representation.

According to some examples, the sequence of bytes, when executed, will cause the machine state to be modified, then the machine state will be reverted to its unmodified state.

According to some examples, another method is used for rewriting some indirect branches or indirect branch targets.

According to some examples, the representation of a program includes one or more of the following: a compiler-style intermediate representation, a binary software program, bytecodes, a control flow graph, a call graph, a data dependence graph, a static single assignment representation, a 3-operand intermediate representation.

According to some examples, the created binary program does not include at least a portion of a copy of code from the computer software program.

According to some examples, the created binary program does not include an entire copy of code from the computer software program.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by a way of example, and not limitation, in the accompanying figures, in which:

FIG. 12 is a diagram showing a rewriting pipeline according to some illustrative embodiments of the invention;

FIG. 13 shows an example process according to some embodiments of the invention.

DETAILED DESCRIPTION OF THE PREFERRED EMBODIMENTS

While the present invention may be embodied in many different forms, the illustrative embodiments are described herein with the understanding that the present disclosure is to be considered as providing examples of the principles of the invention and that such examples are not intended to limit the invention to preferred embodiments described herein and/or illustrated herein.

1. Description of Exemplary Embodiments

An aspect of an embodiment of the present invention, which the present inventors title Zipr™, is a system and method for, but not limited thereto, transforming an original computer program into a reconstructed computer program that incorporates the functionality of the original computer software code along with the functionality of optional enhancements. Zipr operates on computer software code in binary (machine code) format, optionally applies transforms to enhance desirable characteristics (such as security, performance, energy consumption, or providing additional information), and creates a new binary that incorporates the functionality of the original computer software code along with the functionality of the optional enhancements. This process of binary modification is generally known in the literature as static binary rewriting.

Figure 1:
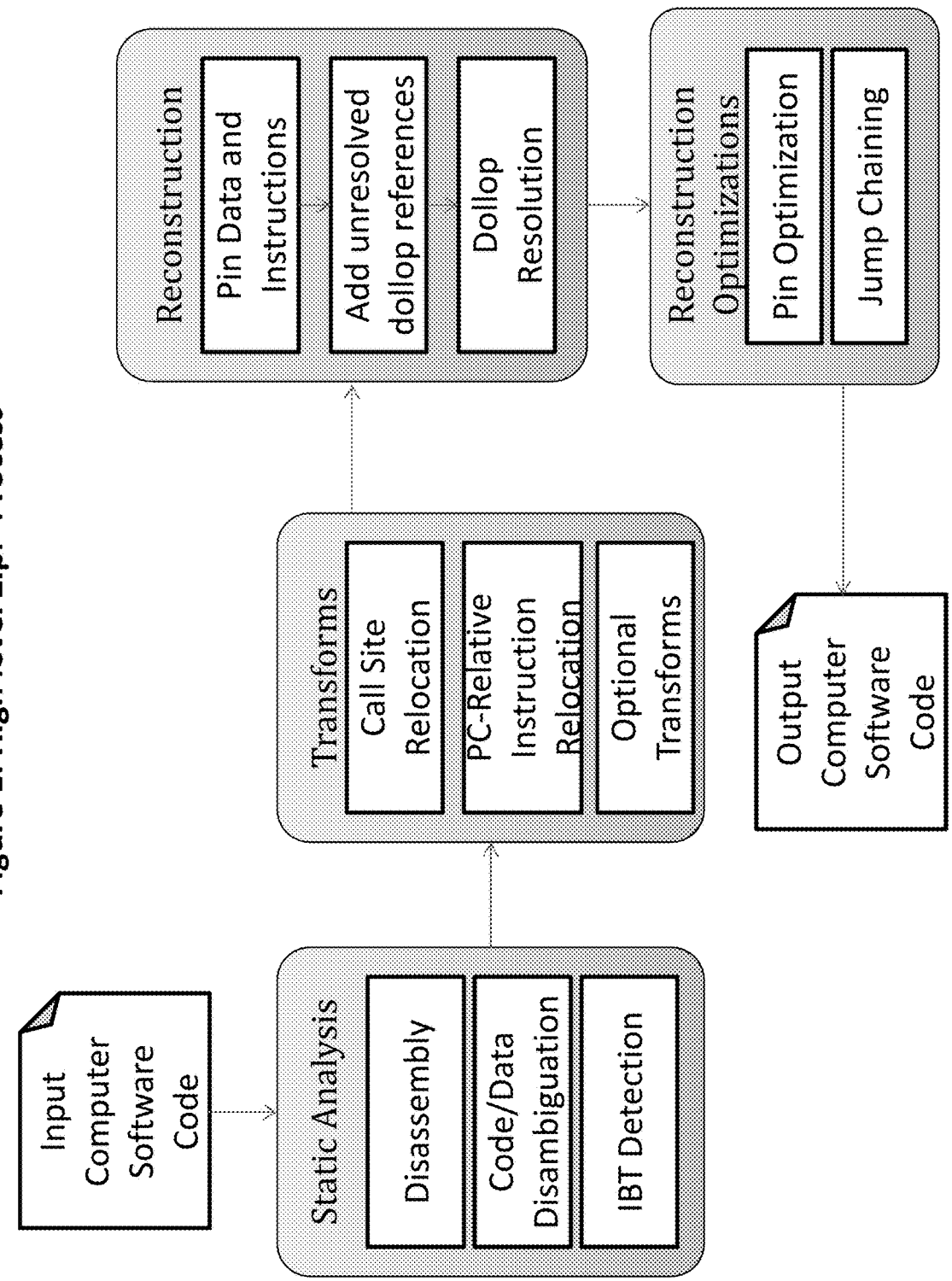
FIG. 1 is flow diagram showing illustrative process steps according to some embodiments of the invention.

An aspect of an embodiment of the present invention can be described in terms of several major steps (which are presented herein for illustration only and should not be construed as limiting the invention in any way):

Binary Analysis
   Static binary disassembly
   Code versus data disambiguation
   Indirect branch target detection
Correctness-preserving Transformations
   Callsite relocation
   PC-relative instructions
Optional Transformations
Computer Software Code Reconstruction
   Pinning data
   Pinning instructions
   Adding unresolved dollop references Dollop Resolution
jump chaining
Pin optimization
Output transformed computer software code These steps are illustrated in FIG. 1 and described in more detail in the following subsections. In Section 2 below, several embodiments of the invention are presented, including rewriting of static binaries, dynamic binaries, and shared library files. In Section 3 below, results are compared to other techniques.

1.1 Binary Analysis

An aspect of an embodiment of the present invention may use a variety of binary analysis techniques to create an intermediate representation (IR) of the original program. In an embodiment, for example, Zipr applies transforms (some optional and some mandatory—see Sections 1.2 and 1.3) to the IR and creates a new binary program.

1.1.1 Binary Disassembly

To create the IR the original program shall be disassembled. Disassembly means finding the starting address of every instruction. Disassembly can be conservative, meaning all instruction start locations are found, even if spurious instruction starting locations are found.

An exemplary Zipr prototype can use, for example but not limited thereto, a combination of several well-known disassembly techniques like linear-scan disassembly or recursive descent disassembly (implemented by the well known IDA Pro interactive disassembler). Additional details on the disassembly techniques are covered in previous publications. See Reference [i] below.

1.1.2 Instruction Versus Data Disambiguation

The present inventors submit that any tool that attempts to achieve static binary rewriting shall disambiguate between instructions and data in a program's machine code. The problem is to determine which portions of a computer software code are interpreted by the computer processor as instructions, and which parts of the computer software code are interpreted as data by the computer processor.

In general, the problem is unsolvable. However, the present inventors submit that in practice the problem may be quite simple. Modern compilers separate code and data into separate areas (often called sections or segments), and modern programs are built almost completely with compiled code.

However it is achieved, Zipr shall distinguish between a program's code and data. One of the current prototypes of the present inventors is for x86-32 and x86-64 Linux binaries which have a clear delineation built in, but any technique would be suitable.

1.1.3 Indirect Branch Target Identification

An aspect of an embodiment of the Zipr technique may rely on knowing which of the discovered instructions might be reached via an indirect branch (IB) (such as an indirect jump, indirect call, or return instruction). Such instructions are called indirect branch targets (IBTs). It is often hard to fully analyze a program to know which indirect branch reaches which instructions, but such analysis is not necessary. Instead, knowing which instructions are IBTs is done via a conservative analysis. Zipr may examine all instructions and data in a program and determine which ones contain the address of any instruction in the program. Any instruction in the program that is "addressed" is marked as a possible IBT. The technique is conceptually and practically similar to the IBT detection done by ILR. See Reference [i].

1.2 Correctness-Preserving Transformations

An aspect of an embodiment of Zipr allows any variety of modifications to the original program. Some modifications are optional to provide additional desirable properties to the rewritten computer software code (described in the next Section 1.3). This section discusses mandatory transformations necessary to preserve correct operation of the application.

Primarily, individual instructions require mandatory correctness-preserving transformations so that they can be relocated to a new address.

1.2.1 PC-Relative Instructions

Instructions that use the program counter (for example in a PC-relative addressing mode) to affect their computations need to be adjusted if they are placed in any location other than their original location. Such instructions can typically be adjusted by changing a constant in the instruction to a new value after placing the instruction in its new location. Consider for example this PC-relative load instruction in x86-64 assembly:

L1: mov rax, [% rip+0x8000]

The instruction accesses data at L1+0x8004 (assuming the instruction is 4 bytes long). To be properly relocated to a new address, the instruction needs to be modified, if we want to place it at location L2, we need to modify the instruction to be:

L2: mov rax, [% rip+0x8000−L2+L1]

Such a transformation is necessary to preserve correct program operation.

1.2.2 Call Instructions

A particular type of PC-relative instruction is the call instruction. The call instruction often stores a return address (on the call stack, or in a given register depending on the architecture). The call instruction cannot easily be adjusted because there is no corresponding constant to adjust as for most PC-relative instructions. However, most architectures support an efficient mechanism for mimicking a call instruction. Consider this x86-32 call instruction:

L1: call L2

The instruction can easily be changed to the instruction pair:

L3: push (L1+5)
jmp L2

The push of L1+5 pushes the return address that the call would push, and the jump instruction transfers control as the call would. Thus, the two instructions perfectly emulate the semantics of the call instruction. (Note: The call instruction at address L1 pushes the address of the next instruction—the instruction that follows the call instruction. Since the call instruction is 5 bytes, the push instruction must push L1+5 to mimic the call's behavior).

This technique efficiently allows call instructions to be relocated to new addresses. However, it is often the case that the computer software code only uses the application's return address in a corresponding return instruction. In this case, mimicking the original computer software code's original behavior does not require extra work. The present inventors can instead choose to just use a call instruction and allow the return instruction to operate normally. Most of the time this is how return addresses are used, and we provide simple analysis to detect and optimize this case. The analysis is similar to the one performed in ILR to randomize return addresses. See Reference [i] below.

1.3 Optional Transformations

An aspect of an embodiment of Zipr can be combined with any variety of optional transformations that transform the program in some way. Consider the following examples:

The program could be transformed to have additional security properties, such as randomized locations of program variables, adding additional security checks (such as buffer bounds checking), or randomizing the location of instructions in a binary for the purposes of artificial diversity.

The program could be transformed to include code that monitors program activity, such as counting how frequently some instructions are executing (instruction profiling), simulating the program on different types of memory hierarchies (memory simulations), or measuring the frequency of branch outcomes (static branch prediction profiling).

The program could be transformed to improve a non-functional property such as execution time, code size, energy consumption, or predictability.

Any possible transformation to the program could be included, including transforms to remove functionality.

1.3.1 Callbacks

In an embodiment, for example, some transforms may have need for a callback. A callback is a function that is called from the program to perform some action, typically an action that is too complex or difficult to do in via inline assembly. An aspect of an embodiment of the Zipr technique includes the ability to statically or dynamically link transformed code to callbacks provided internally or externally.

1.4 Computer Software Code Reconstruction

In an embodiment, for example, reconstruction is really construction of a new binary based on the transformed IR of the original program. Reconstruction is done using a combination of pins and dollops.

In another embodiment, for example, a new binary program is created using a representation of a computer software program, using identified addresses which correspond to a part of the representation; and converting the representation into a created binary program, which includes reserving spaces at the identified addresses in the created binary program's address space at the same addresses as the identified addresses in the representation, where the representation of a program includes one or more of the following: a compiler-style intermediate representation, a binary software program, bytecodes, a control flow graph, a call graph, a data dependence graph, a static single assignment representation, a 3-operand intermediate representation.

1.4.1 Definitions

In an embodiment, for example, a pin or pinned address is an address that cannot be changed. A pin can be the address of a pinned instruction. A pinned instruction is defined as a pinned address that must have a particular functionality when the execution of the program reaches the address of the pin. A pin can also be the address of pinned data. Pinned data is defined to be a pinned address that should contain a particular value when read by the program (until the program modifies it).

Figure 2:
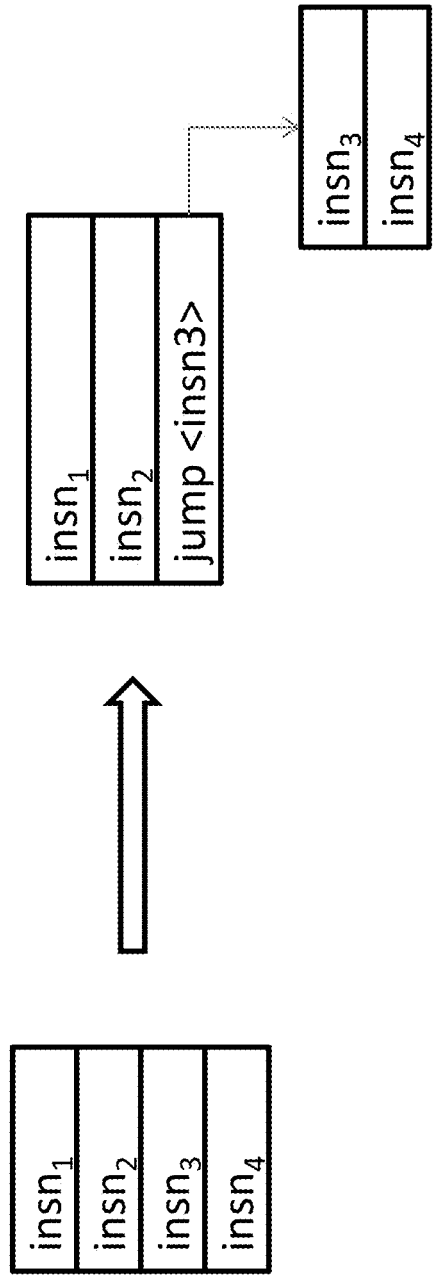
FIG. 2 is a diagram showing splitting a dollop according to some illustrative embodiments of the invention.

In an embodiment, for example, dollops are linear sequences of instructions in a program. A dollop ends at instruction i when Zipr cannot calculate the instruction that follows i. Dollops may be split into smaller dollops by choosing a point in the original dollop and inserting a jump instruction to jump from the end of the first dollop to the beginning of the next dollop. FIG. 2 shows an example of splitting a 4 instruction dollop by splitting after the second instruction.

In an embodiment, for example, a dollop reference is an instruction or data location that encodes the address of a dollop. That is, a dollop reference refers to the location of a dollop and holds the address of the dollop's first instruction. A dollop reference may be unresolved when it is a reference to a dollop whose final location has not yet been determined.

In an embodiment, for example, jump chaining is the process of linking one jump instruction to another jump instruction. It is often necessary to insert a new jump instruction for the process to be successful. Jump chaining helps deal with limited jumps that have a limited ability to encode a destination address.

1.4.2 Algorithm

In an embodiment, for example, an aspect of Zipr's reconstruction algorithm involves carefully pinning code and data addresses, choosing dollops, and placing them into the unpinned areas of a program.

One possible embodiment of Zipr's core algorithm is as follows:

Zipr's could be realized as an iterative dollop placement and resolution process. A set of unresolved dollops is initialized from pinned data and pinned instructions. In each iteration, Zipr chooses an unresolved dollop reference, r. Zipr places the referenced dollop, d, in the reconstructed binary and updates the reference r. If d is referenced more than once, each unresolved dollop reference is updated. Dollop d may itself contain unresolved dollop references. These references will be inserted into the set of unresolved dollop references to be handled on a future iteration. The process ends when all dollop references are resolved.

1.4.2.1 Pinning Data

In an embodiment, for example, the Zipr technique may start by pinning any data that is necessary to pin. Our preliminary prototype pins all data found during binary analysis (see Section 1.1.2). In a Linux ELF file, for example, the entirety of the .data segment is pinned. It should be appreciated that other pinning strategies may be possible.

1.4.2.2 Pinning Instructions

In an embodiment, for example, although most instruction addresses in a program may be relocated, indirect branch targets must be pinned. Indirect branch targets are often difficult to analyze accurately (see Section 1.1.3) and the present inventors choose a conservative approach and pin most of them. One common exception involves the instruction after a call. While it is typically the target of an IB, i.e. the corresponding return instruction, analyzing the call/return pattern of the application is often possible. Since call/return pairs are common, such IBTs warrant special handling. Call/return pairs that cannot be sufficiently analyzed get adjusted to account for any PC-relative address (as discussed in Section 1.2.2) and the return address gets pinned.

During instruction pinning, if any instruction pinning overlaps an existing data pin, we report that the location is used as both code and data. This action may result in Zipr aborting the transformation and being unable to transform the program. Such instances are rare.

1.4.2.3 Adding Initial Unresolved Dollop References

In an embodiment, for example, a possible first source of unresolved dollop references are the pinned instructions. Zipr considers each pinned instruction, a, to be the start of a dollop, d. Therefore, at each pinned Instruction address, Zipr can place a jump instruction whose target is an unresolved dollop reference to d. In the final reconstructed program this jump instruction will have the effect of transferring program control to the instruction(s) for dollop d.

On architectures with a fixed width instruction, there is always room for a jump instruction at the pinned location. On architectures with a variable length instruction (most notably x86 architectures), a short jump instruction is often provided and almost always fits.

Figure 3:
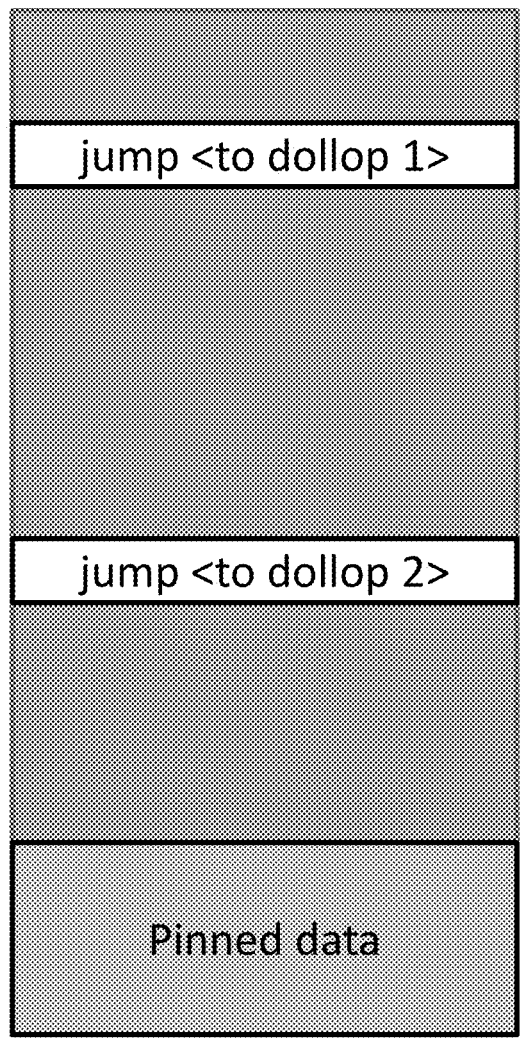
FIG. 3 shows an example of an address space after pinned data and instructions have been marked, and the pinned instructions have been filled with unresolved dollop references according to some embodiments of the invention.

FIG. 3 shows an example of the address space after pinned data and instructions have been marked, and the pinned instructions have been filled with unresolved dollop references. The grey area indicates pinned data, while the green portions indicate unpinned areas.

1.4.2.4 Dollop Resolution

After pinned instructions have been converted to jump instructions whose targets comprise the initial set of unresolved dollop references, Zipr might begin the iterative dollop resolution and placement process.

The order of dollop placement and unresolved dollop reference resolution is not important. An example prototype may use a top-dawn approach where any existing unresolved references are used to select the next dollop to place.

Figure 4:
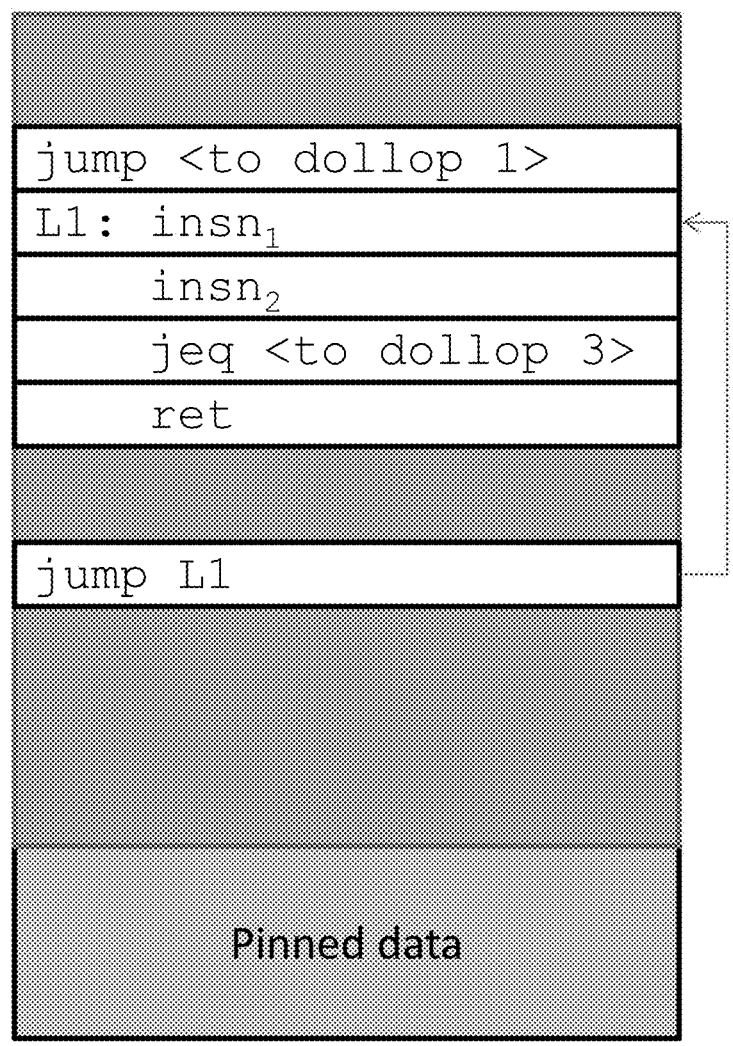
FIG. 4 shows an example of an address space with one resolved dollop according to some illustrative embodiments of the invention.

In an embodiment, for example, a dollop can be placed in any free area of memory. A place to start is the areas of memory that are used in the original program and not marked as pinned. This technique is, in essence, "filling in the holes" between pinned areas. FIG. 4 shows how the example in FIG. 3 might resolve an unresolved dollop reference by placing dollop 2 in an unused portion of the address space.

Note that the ret instruction ends the dollop, and that the jeq instruction creates a new unresolved dollop reference.

Figure 5:
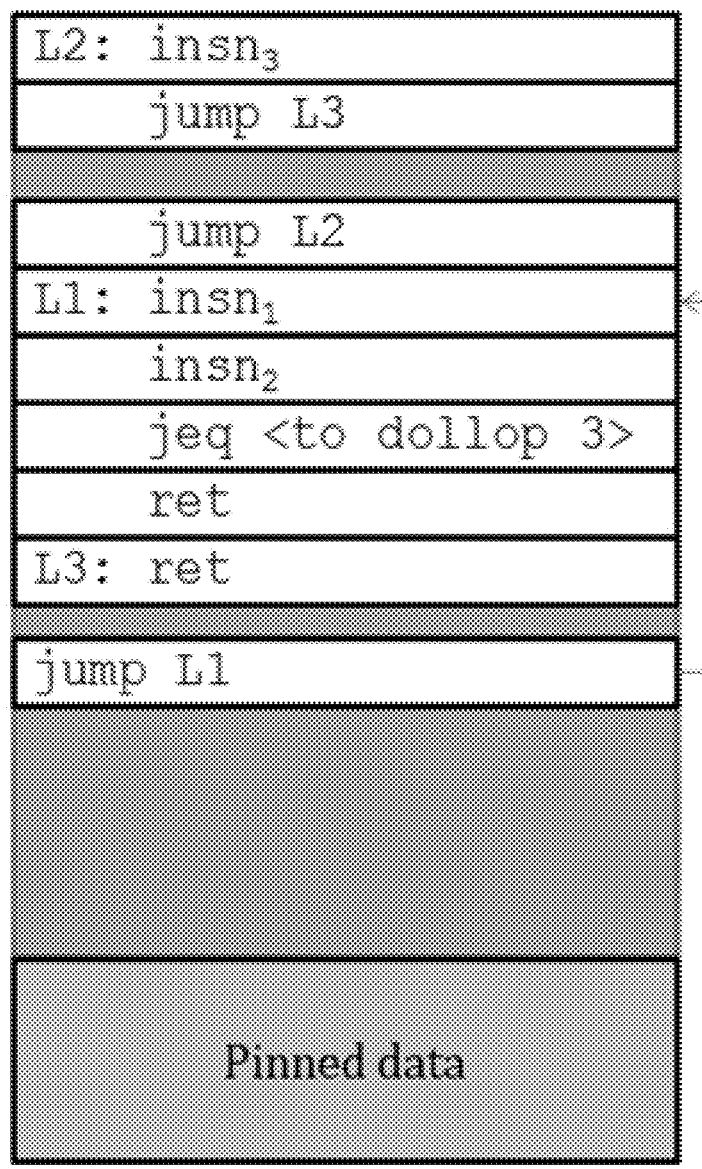
FIG. 5 is a further example showing splitting of a dollop according to some illustrative embodiments.

To save space, some dollops may be split (as demonstrated in FIG. 2) to fit within a small unused portion of the address space. FIG. 5 continues the example by showing how dollop 1 might be placed via splitting into two free areas. Dollop resolution ends when there are no dollops left to place.

It should be noted that the order of dollop selection, placement and splitting choices may dramatically affect the final layout of the data and code, as well as the quality of the reconstructed binary. It should be further noted that instructions with PC-relative addressing may need to be adjusted as dollops are placed and instruction locations are selected.

1.4.2.5 Jump Chaining

In some cases, it may not be possible to directly link an unresolved dollop reference to the location selected for the dollop. Difficulty arises when the space for the encoding of a jump's offset is not large enough to store the address of the final dollop location.

In such cases, jump chaining may be necessary. Jump chaining refers to resolving an unresolved dollop reference by linking it to a jump instruction that itself contains an unresolved reference to the same dollop. In some cases, new jump instructions must be inserted to provide a suitable location to chain jumps.

Jump chaining is typically undesirable, and often best avoided when not necessary.

1.4.2.6 Pin and Dollop Optimizations

Figure 6:
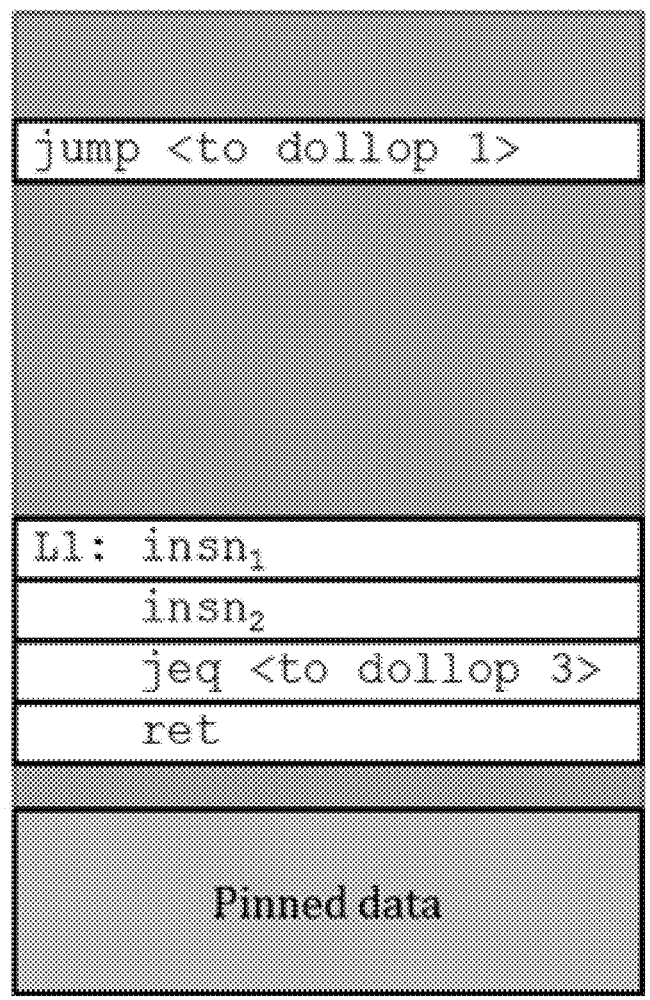
FIG. 6 shows the example from FIG. 3 where dollop 2 has been resolved on top of the unresolved reference according to some illustrative embodiments.

In the examples shown previously, a jump instruction was located at each pinned instruction address. Such instructions take room and do little to advance the computation of the program. Eliding them is typically possible by placing the target dollop directly over the inserted jump instruction. FIG. 6 shows the example from FIG. 3 where dollop 2 has been resolved on top of the unresolved reference.

Figure 7:
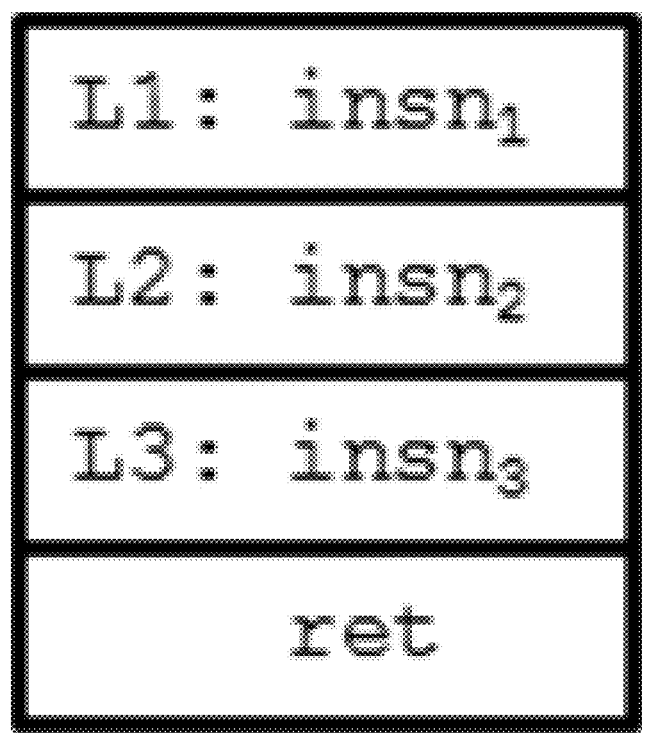
FIG. 7 is a diagram showing dollop selection choices according to some illustrative embodiments.

Other optimizations may be possible. For example, the definition of a dollop allows a single instruction to be part of many dollops. Consider FIG. 7. The return instruction could be part of dollops that start at L1, L2, or L3, or even a dollop on its own. Selecting and placing the right dollops can be challenging. One embodiment of Zipr simply chooses dollops based on unresolved references.

Placing dollops into areas between pinned locations can also be challenging. Packing a set of selected dollops into a set of free locations is a classic bin-packing problem and has a variety of solutions.

1.4.2.7 Output Transformed Computer Software Code

In an embodiment, for example, the last step of the Zipr process is to output the transformed program. The program can be output in any variety of formats.

1.5 Summary

In an embodiment, for example but not limited thereto, the Zipr technique starts by analyzing a computer software code, determining which bits are code, which bits are data, where indirect branch targets are, etc. Next the Zipr technique allows for the program to be transformed. Some transforms, including some PC-relative addressing transforms, are required for correct operation of the reconstructed program. Lastly, the reconstructed binary is constructed based on the information given by pinning data, pinning instructions, adding references to dollops, and finally placing and optimizing the program dollops.

2. Exemplary Embodiments

An aspect of an embodiment of the present invention may be used to process binaries uploaded via a computer's network connection, hard disk, or other transfer mechanisms.

An aspect of an embodiment of the present invention may be used to transform any type of file that contains computer software code, including but not limited thereto, ELF, COFF, PE, or raw binary files.

An aspect of an embodiment of the present invention may be used to transform statically linked or dynamically linked computer software code.

An aspect of an embodiment of the present invention can be effective for desktop, server, or embedded computer software code.

2.1 Pins

Pins, or pinned addresses, are code/data that have a particular, defined location and size within a binary. We will focus on pinned code here. Because particular code has to go at a particular location, if there are many areas in a binary such a restriction is encountered, simultaneously resolving all conflicts can be challenging. Consider the following code:

| 4034ee | \<noopMutexEnter\>: | ret |
| 4034ef | \<noopMutexTry\>: | xor eax, eax |
| 4034f1 | | ret |
| 4034f2 | \<noopMutexLeave\>: | ret |

In this code taken from a server program we were analyzing we found that the code at locations 0x4034ee, 0x4034ef, and 0x4034f2 all required pinning. We will use this example throughout the document to understand different techniques for resolving dense pins.

2.2 Inserting Jumps

In some areas, Zipr can insert a jump from the pinned location to the necessary code. At location 0x4034ef we see that Zipr could insert a 2-byte jump without overwriting the other pin instructions. Resulting code for our example may be:

```
4034ee    <noopMutexEnter>:    ret
4034ef    <noopMutexTry>:      jmp 0x40e4f3
4034f1                         -- unused.
4034f2    <noopMutexLeave>:    ret
4034f3                         xor eax, eax
4034f5                         ret
```

2.3 Branch Chaining

Note that many architectures have a limited range for branch instructions. Thus, a branch may not be able to encode the target destination if it is too far away or there is limited room for the instruction. The previous section used a 2-byte jmp instruction to reach the corresponding code, which can only change the program counter (PC) by +/−127. If the code where further away, a branch chain could be used:

```
4034ee    <noopMutexEnter>:    ret
4034ef    <noopMutexTry>:      jmp 0x40e4f3
4034f1                         -- unused.
4034f2    <noopMutexLeave>:    ret
4034f3                         jmp 0x500000
...
500000                         xor eax, eax
4034f5                         ret
```

2.4 Two Pins in a Row

In some cases, we note that there are two pins in a row. Note that addresses 0x4034ee and 0x4034ef are an example of this situation. This situation can happen on architectures with a variable length instruction encoding such as x86 machines. In this case, we can attempt to find an instruction sequence which is interpreted by the processor in a way that modifies system state in a way that can be 1) undone, and 2) distinguish what pinned instruction was jumped to.

Incrementing the Stack Pointer

This example on x86-32 machines demonstrates one way to deal with two pins in a row:

```
4034ee    <noopMutexEnter>:    inc %sp
4034ef    <noopMutexTry>:      jmp 0x4034f3
4034f1                         -- unused
4034f2    <noopMutexLeave>:    ret
4034f3                         if (%sp & 1)
                               {
                                   dec %sp
                                   ret
                               }
                               else
                               {
                                   xor eax, eax
                                   ret
                               }
```

In this example, if the code jumps to 0x403ee, the stack pointer is incremented by 1. It is not incremented if we jump to 4034ef. Because we know the stack pointer must stay aligned according to the ABI, we can test the lowest bit of the stack pointer to see (at 4034f3) which path was taken.

If we determine that 40e4ee was taken, we restore the program's state and execute the correct instructions. Otherwise, we can execute the instructions for the 40e4ef.

The stack pointer technique can be generalized to up to 4 pinned instructions in a row, provided there is some space after for a 2-byte jump (which may need chaining).

Leveraging Variable Length Instructions

Consider this sequence of bytes for our example on an x86-32 machine:

```
4034ee                         byte 68
4034ef                         byte eb
4034f1                         byte <offset to 4034f6>
4034f2                         byte X
4034f3                         byte Y
4034f4                         jmp 0404000
4034f6                         xor eax, eax
40e4f8                         ret
...
404000:                        lea esp, [esp-4]
404004:                        ret
```

Where the byte 68 is the opcode for a 5-byte instruction that pushes an immediate on the stack. Thus, if the program jumps to 4034ee, it will push a value on the stack, jump to 404000, take that value off the stack, and then execute the code for 4034ee. If the program jumps to 4034ef, it will execute the instruction there, which has opcode 0xeb—a jump instruction to 4034f6. Which executes the xor, ret instructions as indicated by the original program.

This sequence generalizes a bit, but is quite limited. However it's very efficient for dealing with 2 pins in a row.

Other Instruction Sequences

We note that many variations of these techniques are possible. For example, in the section where we used "inc sp" to distinguish which path was used, we can also use any variety of processor flags. For example, the direction flag on x86 machines is a good candidate since its value is known, and can be modified in a 1-byte instructions (std or cld).

Another possibility is to use an instruction prefix to modify the instruction at the location of the second pin. For example, on x86-64 machines, one could use the rex.w prefix at the location of the first pin, and use it to modify an "inc sp" instruction located at the second pin. The rex.w prefix converts the "inc sp" into an "inc r14". Thus, if the first pin is executed, the machine state does an "inc r14", and if the second pin is executed the machine does an "inc sp". Code after can test the stack pointer to determine if it was incremented, and repair state and dispatch to the correct code accordingly.

2.5 Many Pins in a Row—"The 68 Med"

None of the techniques mentioned in previous sections can deal with an arbitrary number of pinned instructions in a row. Such a case is exceedingly rare, but important for a rewriting system to handle correctly. Since it is exceedingly rare, being efficient is not a high priority.

Consider 10 bytes in a row that are all pinned and need to be handled. None of the previously described techniques work. Consider, instead, putting a byte with value 0x68 at each of the 10 bytes, followed by 4 bytes of 0x90. The code might look like this:

|  | Byte value | Instruction Stream from 403000 | Instruction Stream from 403001 | Instruction Stream from 403009 |
|---|---|---|---|---|
| 403000 | 68 | push | | |
| 403001 | 68 | 0x68686868 | push 0x68686868 | |
| 403002 | 68 | | | |
| 403003 | 68 | | | |
| 403004 | 68 | | | |
| 403005 | 68 | push | | |
| 403006 | 68 | 0x68686868 | push 0x90686868 | |
| 403007 | 68 | | | |
| 403008 | 68 | | | |

-continued

|  | Byte value | Instruction Stream from 403000 | Instruction Stream from 403001 | Instruction Stream from 403009 |
|---|---|---|---|---|
| 403009 | 68 |  |  | push 0x90909090 |
| 40300a | 90 | nop |  |  |
| 40300b | 90 | nop | nop |  |
| 40300c | 90 | nop | nop |  |
| 40300d | 90 | nop | nop |  |

(Note that we are using a different example now.)

Remember that 0x68 is the opcode for a 5-byte instruction that pushes an immediate value on the stack. In the table, the first column shows the address, while the $2^{nd}$ column shows the byte value. The third column shows the instruction stream the process would execute if it were to jump to 403000—that is, it pushes 2 values on the stack, followed by 4 no-operation instructions (hops). If the process jumps to address 403001, we note that it also pushes two values, but that the $2^{nd}$ value is slightly different 0x68686868 versus 0x90686868. The code at 0x40300e can inspect to see which values were actually pushed onto the stack to distinguish which instruction in the region was jumped to. The last column of the table shows that if the processor jumps to the end of the pinned area, that fewer values are pushed, to help distinguish which of the 10 cases got executed.

While not particularly efficient, this process can generalize to an arbitrarily high number of consecutive pins. We have tested, using a synthetic benchmark, up to 40 bytes of pins in a row and noted correct operation. We refer to this technique as the "68 sled" for brevity.

Areas With High Pin Density

Many of the techniques in previous sections required additional space to "undo" some state transform that occurred. Typically branch chaining is used to jump to an area with sufficient space. However, if too many pins are in a small area, branch chaining can cause a problem because there aren't enough bytes in the area to provide chaining. In these situations, a "68 sled" can be used to reduce density. Again, this is an extremely rare situation.

3. Benefits of Zipr (Which are Presented Herein for Illustration Only and Should Not be Construed as Limiting the Invention in Any Way)

Figure 8:
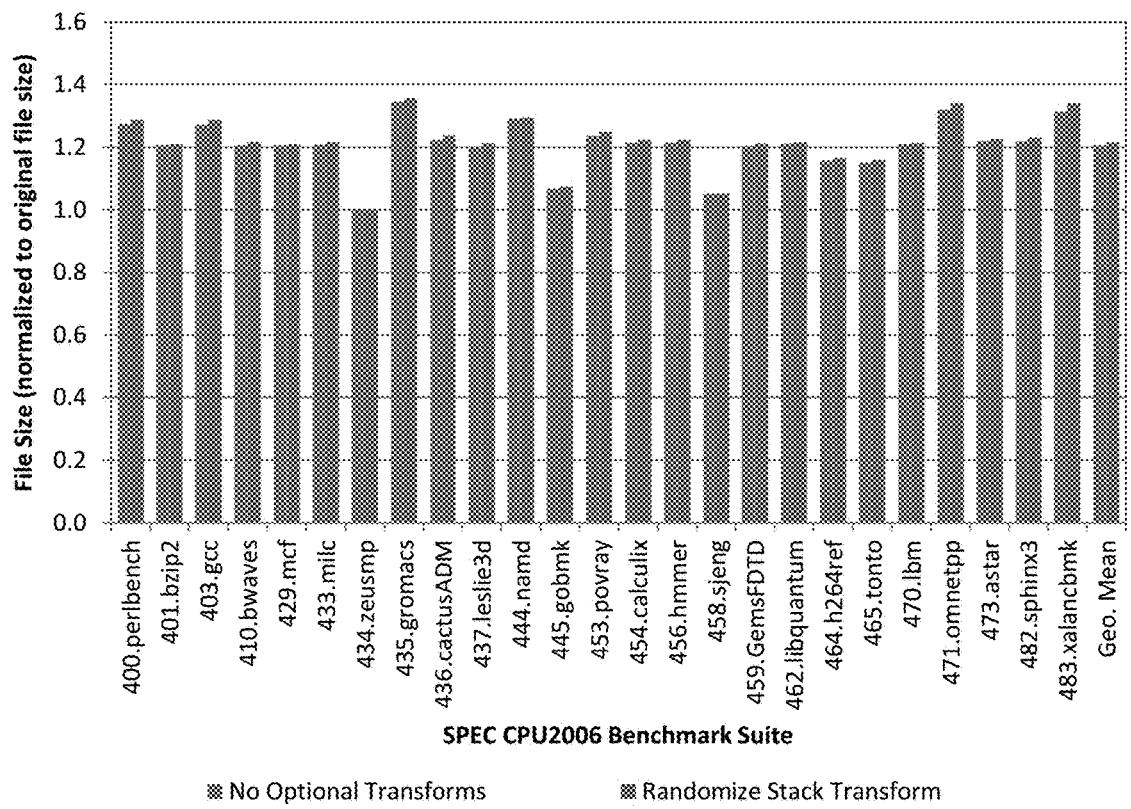
FIG. 8 is a graph showing file size increase for x86-32 architecture according to some illustrative embodiments.
Figure 9:
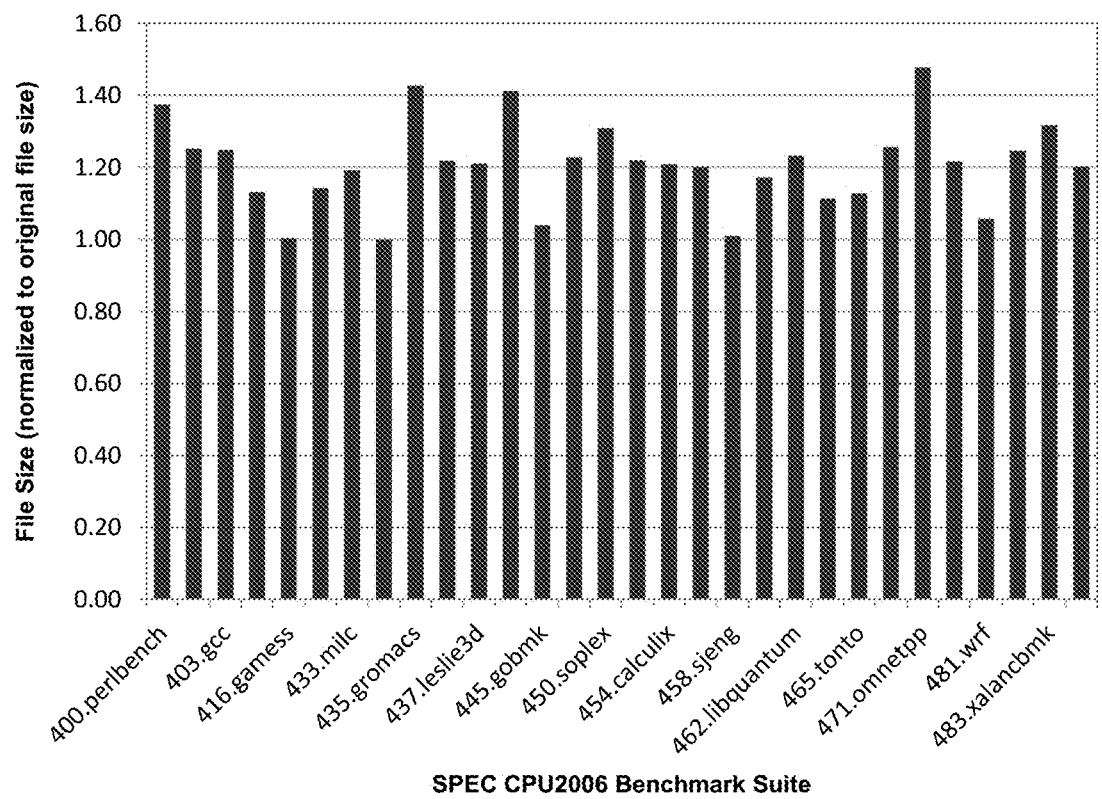
FIG. 9 is a graph showing file size increase for x86-64 architecture according to some illustrative embodiments.

In an embodiment, for example, Zipr does not need to save a copy of the original computer software code. Most techniques require the original computer code to be saved, which causes significant size increase in the resulting programs (both in memory and on disk). (SecondWrite, etc.). Such techniques are particularly unsuited for rewriting of embedded computer software codes. FIG. 8 shows the size overhead for the SPEC CPU2006 benchmarks as compiled for an x86-32 architecture when rewritten with our Zipr prototype. The first bar shows an average of 20.5% file size increase when no optional transformations are used. The second bar shows an average overhead of 21.5% file size increase when an optional transformation is used to randomize the size and layout of the program's activation stack. FIG. 9 shows the file size increase for an x86-64 architecture with no optional transformations.

In an embodiment, for example, Zipr does not rely on computer software code that was developed in a particular way, such as a particular compiler, compiler flags, a particular source language, etc. Many techniques suffer from this problem (Diablo, Vulcan, etc.)

In an embodiment, for example, Zipr has extremely small performance overhead. Other systems may have unacceptably high performance overhead.

In an embodiment, for example, Zipr requires no run-time system (such as a virtualization system) to accompany the program. Such run-time systems often cause additional disk usage, memory usage, and CPU usage, resulting in a degradation of the desirableness of the resulting system.

4. Illustrative Machine Architecture

Figure 10:
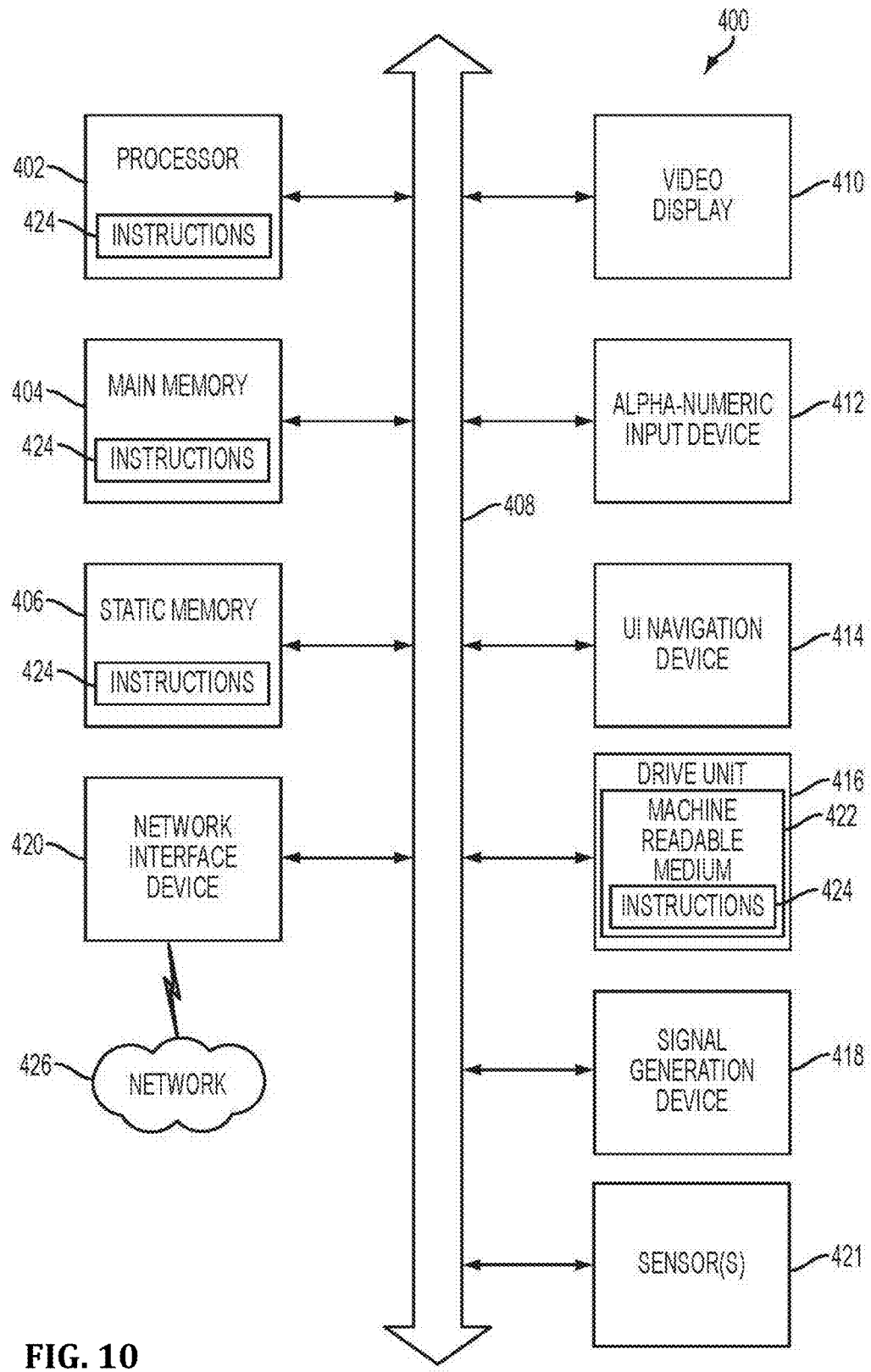
FIG. 10 is a block diagram illustrating an example of a machine upon which one or more aspects of embodiments of the present invention can be implemented.

FIG. 10 is a block diagram illustrating an example of a machine upon which one or more aspects of embodiments of the present invention can be implemented.

FIG. 10 illustrates a block diagram of an example machine 400 upon which one or more embodiments (e.g., discussed methodologies) can be implemented (e.g., run).

Examples of machine 400 can include logic, one or more components, circuits (e.g., modules), or mechanisms. Circuits are tangible entities configured to perform certain operations. In an example, circuits can be arranged (e.g., internally or with respect to external entities such as other circuits) in a specified manner. In an example, one or more computer systems (e.g., a standalone, client or server computer system) or one or more hardware processors (processors) can be configured by software (e.g., instructions, an application portion, or an application) as a circuit that operates to perform certain operations as described herein. In an example, the software can reside (1) on a non-transitory machine readable medium or (2) in a transmission signal. In an example, the software, when executed by the underlying hardware of the circuit, causes the circuit to perform the certain operations.

In an example, a circuit can be implemented mechanically or electronically. For example, a circuit can comprise dedicated circuitry or logic that is specifically configured to perform one or more techniques such as discussed above, such as including a special-purpose processor, a field programmable gate array (FPGA) or an application-specific integrated circuit (ASIC). In an example, a circuit can comprise programmable logic (e.g., circuitry, as encompassed within a general-purpose processor or other programmable processor) that can be temporarily configured (e.g., by software) to perform the certain operations. It will be appreciated that the decision to implement a circuit mechanically (e.g., in dedicated and permanently configured circuitry), or in temporarily configured circuitry (e.g., configured by software) can be driven by cost and time considerations.

Accordingly, the term "circuit" is understood to encompass a tangible entity, be that an entity that is physically constructed, permanently configured (e.g., hardwired), or temporarily (e.g., transitorily) configured (e.g., programmed) to operate in a specified manner or to perform specified operations. In an example, given a plurality of temporarily configured circuits, each of the circuits need not be configured or instantiated at any one instance in time. For example, where the circuits comprise a general-purpose processor configured via software, the general-purpose processor can be configured as respective different circuits at different times. Software can accordingly configure a processor, for example, to constitute a particular circuit at one instance of time and to constitute a different circuit at a different instance of time.

In an example, circuits can provide information to, and receive information from, other circuits. In this example, the circuits can be regarded as being communicatively coupled to one or more other circuits. Where multiple of such circuits exist contemporaneously, communications can be achieved through signal transmission (e.g., over appropriate circuits and buses) that connect the circuits. In embodiments in which multiple circuits are configured or instantiated at different times, communications between such circuits can be achieved, for example, through the storage and retrieval of information in memory structures to which the multiple circuits have access. For example, one circuit can perform an operation and store the output of that operation in a memory device to which it is communicatively coupled. A further circuit can then, at a later time, access the memory device to retrieve and process the stored output. In an example, circuits can be configured to initiate or receive communications with input or output devices and can operate on a resource (e.g., a collection of information).

The various operations of method examples described herein can be performed, at least partially, by one or more processors that are temporarily configured (e.g., by software) or permanently configured to perform the relevant operations. Whether temporarily or permanently configured, such processors can constitute processor-implemented circuits that operate to perform one or more operations or functions. In an example, the circuits referred to herein can comprise processor-implemented circuits.

Similarly, the methods described herein can be at least partially processor-implemented. For example, at least some of the operations of a method can be performed by one or processors or processor-implemented circuits. The performance of certain of the operations can be distributed among the one or more processors, not only residing within a single machine, but deployed across a number of machines. In an example, the processor or processors can be located in a single location (e.g., within a home environment, an office environment or as a server farm), while in other examples the processors can be distributed across a number of locations.

The one or more processors can also operate to support performance of the relevant operations in a "cloud computing" environment or as a "software as a service" (SaaS). For example, at least some of the operations can be performed by a group of computers (as examples of machines including processors), with these operations being accessible via a network (e.g., the Internet) and via one or more appropriate interfaces (e.g., Application Program interfaces (APIs).)

Example embodiments (e.g., apparatus, systems, or methods) can be implemented in digital electronic circuitry, in computer hardware, in firmware, in software, or in any combination thereof. Example embodiments can be implemented using a computer program product (e.g., a computer program, tangibly embodied in an information carrier or in a machine readable medium, for execution by, or to control the operation of, data processing apparatus such as a programmable processor, a computer, or multiple computers).

A computer program can be written in any form of programming language, including compiled or interpreted languages, and it can be deployed in any form, including as a stand-alone program or as a software module, subroutine, or other unit suitable for use in a computing environment. A computer program can be deployed to be executed on one computer or on multiple computers at one site or distributed across multiple sites and interconnected by a communication network.

In an example, operations can be performed by one or more programmable processors executing a computer program to perform functions by operating on input data and generating output. Examples of method operations can also be performed by, and example apparatus can be implemented as, special purpose logic circuitry (e.g., a field programmable gate array (FPGA) or an application-specific integrated circuit (ASIC)).

The computing system can include clients and servers. A client and server are generally remote from each other and generally interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware can be a design choice. Below are set out hardware (e.g., machine 400) and software architectures that can be deployed in example embodiments.

In an example, the machine 400 can operate as a stand-alone device or the machine 400 can be connected (e.g., networked) to other machines.

In a networked deployment, the machine 400 can operate in the capacity of either a server or a client machine in server-client network environments. In an example, machine 400 can act as a peer machine in peer-to-peer (or other distributed) network environments. The machine 400 can be a personal computer (PC), a tablet PC, a set-top box (STB), a Personal Digital Assistant (PDA), a mobile telephone, a web appliance, a network router, switch or bridge, or any machine capable of executing instructions (sequential or otherwise) specifying actions to be taken (e.g., performed) by the machine 400. Further, while only a single machine 400 is illustrated, the term "machine" shall also be taken to include any collection of machines that individually or jointly execute a set (or multiple sets) of instructions to perform any one or more of the methodologies discussed herein.

Example machine (e.g., computer system) 400 can include a processor 402 (e.g., a central processing unit (CPU), a graphics processing unit (GPU) or both), a main memory 404 and a static memory 406, some or all of which can communicate with each other via a bus 408. The machine 400 can further include a display unit 410, an alphanumeric input device 412 (e.g., a keyboard), and a user interface (UI) navigation device 411 (e.g., a mouse). In an example, the display unit 410, input device 417 and UI navigation device 414 can be a touch screen display. The machine 400 can additionally include a storage device (e.g., drive unit) 416, a signal generation device 418 (e.g., a speaker), a network interface device 420, and one or more sensors 421, such as a global positioning system (GPS) sensor, compass, accelerometer, or other sensor.

The storage device 416 can include a machine readable medium 422 on which is stored one or more sets of data structures or instructions 424 (e.g., software) embodying or utilized by any one or more of the methodologies or functions described herein. The instructions 424 can also reside, completely or at least partially, within the main memory 404, within static memory 406, or within the processor 402 during execution thereof by the machine 400. In an example, one or any combination of the processor 402, the main memory 404, the static memory 406, or the storage device 416 can constitute machine readable media.

While the machine readable medium 422 is illustrated as a single medium, the term "machine readable medium" can include a single medium or multiple media (e.g., a centralized or distributed database, and/or associated caches and servers) that configured to store the one or more instructions 424. The term "machine readable medium" can also be taken to include any tangible medium that is capable of storing, encoding, or carrying instructions for execution by the machine and that cause the machine to perform any one or more of the methodologies of the present disclosure or that is capable of storing encoding or carrying data structures utilized by or associated with such instructions. The term "machine readable medium" can accordingly be taken to include, but not be limited to, solid-state memories, and optical and magnetic media. Specific examples of machine readable media can include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 424 can further be transmitted or received over a communications network 426 using a transmission medium via the network interface device 420 utilizing any one of a number of transfer protocols (e.g., frame relay, IP, TCP, UDP, HTTP, etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., IEEE 802.11 standards family known as Wi-Fi®, IEEE 802.16 standards family known as WiMax®), peer-to-peer (P2P) networks, among others. The term "transmission medium" shall be taken to include any intangible medium that is capable of storing, encoding or carrying instructions for execution by the machine, and includes digital or analog communications signals or other intangible medium to facilitate communication of such software.

Various embodiments or aspects of the invention, for example, can be implemented as software in a computing device, or alternatively, on hardware. An exemplary computing device in which an embodiment of the invention, or a portion thereof, can be implemented is schematically illustrated in FIG. 11. Although some aspects may be known, a brief explanation will be provided herein for the convenience of other readers.

Figure 11A:
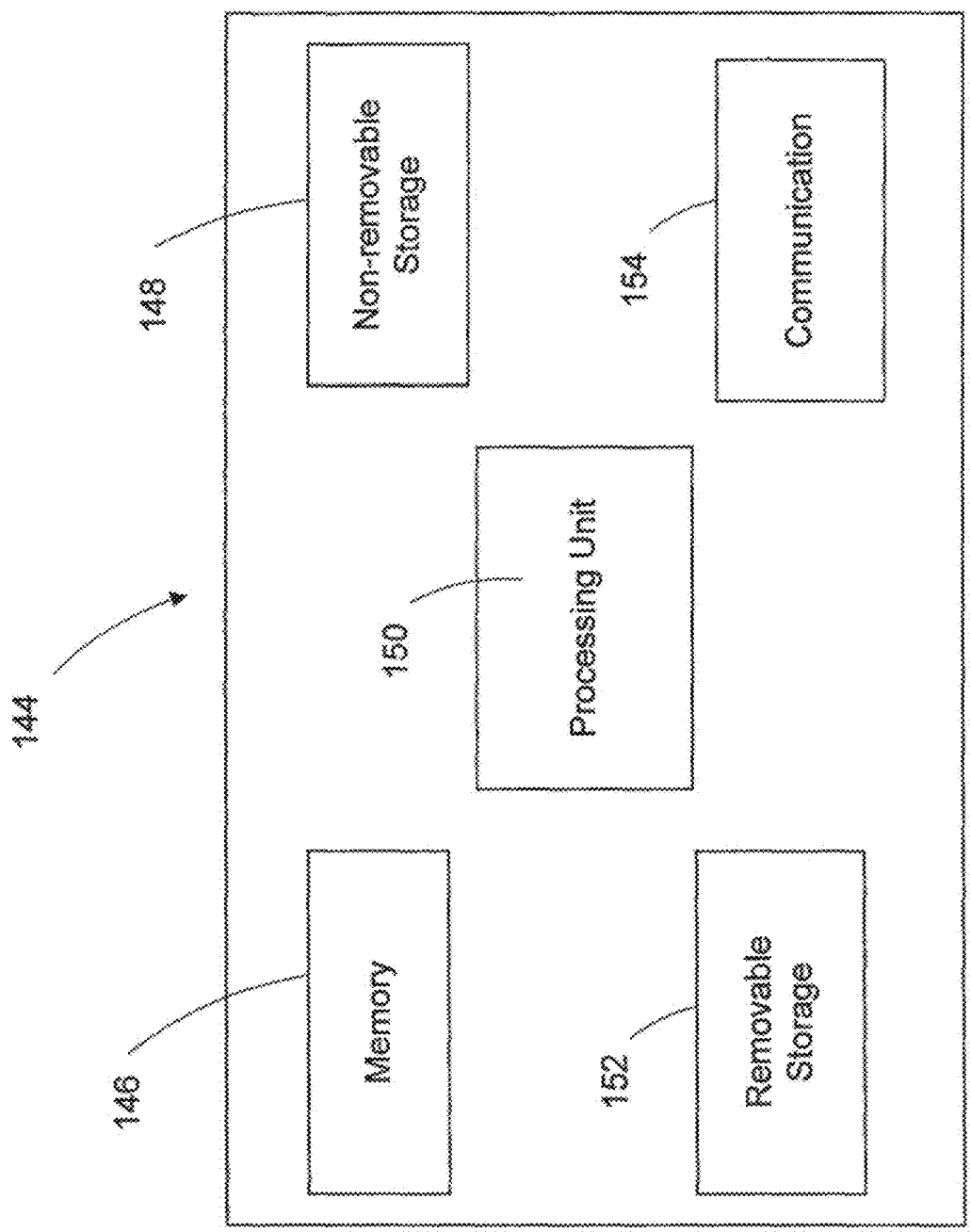
FIG. 11(A) shows an illustrative computing device with which embodiments of the invention can be implemented according to some examples.

Referring to FIG. 11(A), in its most basic configuration, computing device 144 typically includes at least one processing unit 150 and memory 146. Depending on the exact configuration and type of computing device, memory 146 can be volatile (such as RAM), non-volatile (such as ROM, flash memory, etc.) or some combination of the two.

Additionally, device 144 may also have other features and/or functionality. For example, the device could also include additional removable and/or non-removable storage including but not limited to, magnetic or optical disks or tape, as well as writable electrical storage media. Such additional storage is the figure by removable storage 152 and non-removable storage 148. Computer storage media includes volatile and nonvolatile, removable and non-removable media implemented in any method or technology for storage of information such as computer readable instructions, data structures, program modules or other data. The memory, the removable storage and the non-removable storage are all examples of computer storage media. Computer storage media includes, but is not limited to, RAM, ROM, EEPROM, flash memory or other memory technology CDROM, digital versatile disks (DVD) or other optical storage, magnetic cassettes, magnetic tape, magnetic disk storage or other magnetic storage devices, or any other medium which can be used to store the desired information and which can accessed by the device. Any such computer storage media may be part of, or used in conjunction with, the device.

The device may also contain one or more communications connections 154 that allow the device to communicate with other devices (e.g. other computing devices). The communications connections carry information in a communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode, execute, or process information in the signal. By way of example, and not limitation, communication medium includes wired media such as a wired network or direct-wired connection, and wireless media such as radio, RF, infrared and other wireless media. As discussed above, the term computer readable media as used herein includes both storage media and communication media.

Figure 11B:
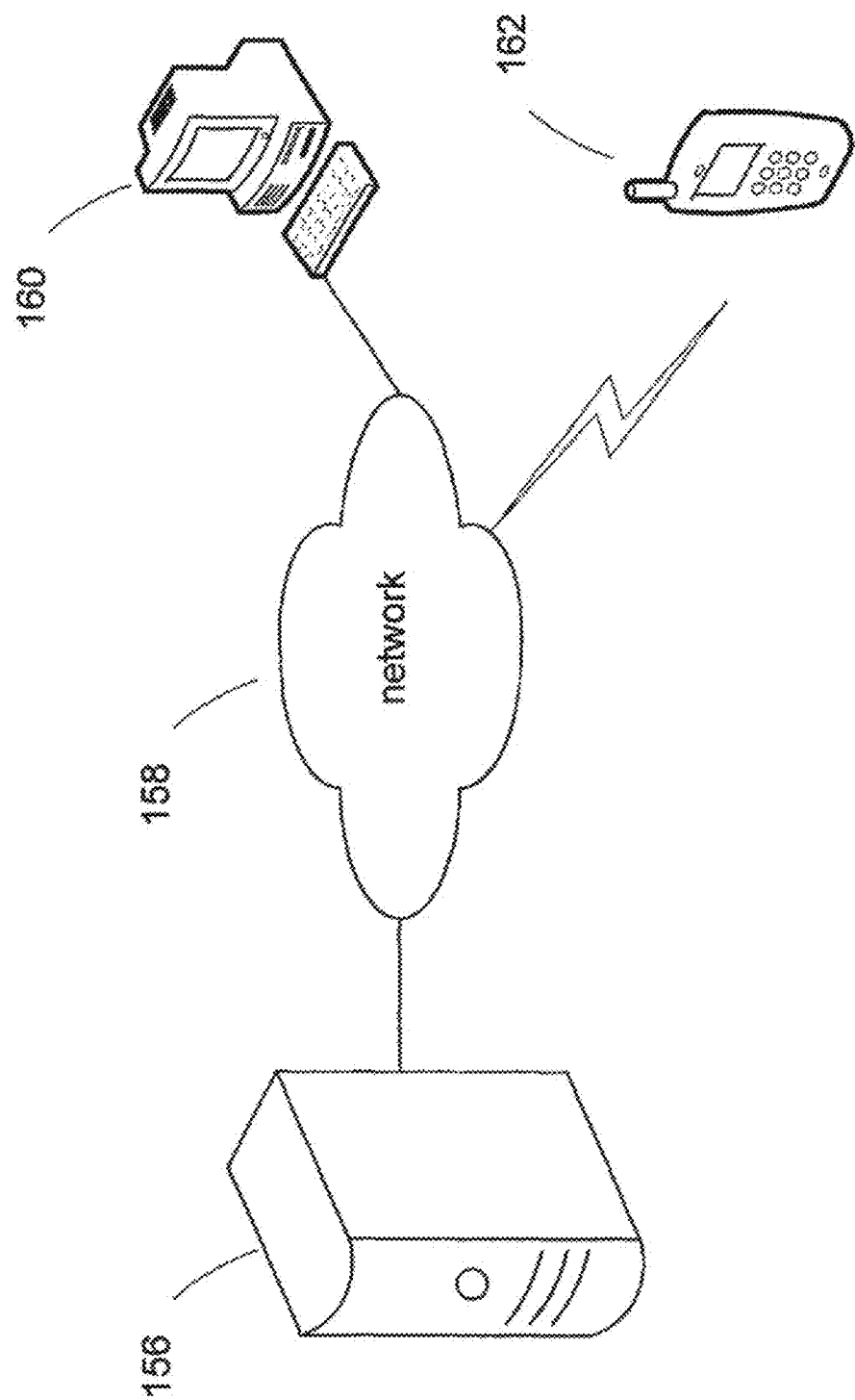
FIG. 11(B) shows an illustrative network system in which embodiments of the invention can be implemented in some examples.

In addition to a stand-alone computing machine, embodiments of the invention can also be implemented on a network system comprising a plurality of computing devices that are in communication with a networking means, such as a network with an infrastructure or an ad hoc network. The network connection can be wired connections or wireless connections. As a way of example, FIG. 11(B) illustrates a network system in which embodiments of the invention can be implemented. In this example, the network system comprises computer 156 (e.g., a network server), network connection means 158 (e.g. wired and/or wireless connections), computer terminal 160, and PDA (e.g., a smart-phone) 162 (or other handheld or portable device, such as a cell phone, laptop computer, tablet computer, GPS receiver, mp3 player, handheld video player, pocket projector, etc. or handheld devices (or non-portable devices) with combinations of such features). The embodiments of the invention can be implemented in anyone of the devices of the system. For example, execution of the instructions or other desired processing can be performed on the same computing device that is anyone of 156, 160, and 162. Alternatively, an embodiment of the invention can be performed on different computing devices of the network system. For example, certain desired or required processing or execution can be performed on one of the computing devices of the network (e.g. server 156), whereas other processing and execution of the instruction can be performed at another computing device (e.g. terminal 160) of the network system, or vice versa. In fact, certain processing or execution can be performed at one computing device (e.g. server 156); and the other processing or execution of the instructions can be performed at different computing devices that may or may not be networked. For example, the certain processing can be performed at terminal 160, while the other processing or instructions are passed to device 162 where the instructions are executed. This scenario may be of particular value especially when the PDA device, for example, accesses to the network through computer terminal 160 (or an access point in an ad hoc network). For another example, software to be protected can be executed, encoded or processed with one or more embodiments of the invention. The processed, encoded or executed software can then be distributed to customers. The distribution can be in a form of storage media (e.g. disk) or electronic copy.

Practice of an aspect of an embodiment (or embodiments) of the invention is presented herein for illustration only and should not be construed as limiting the invention in any way.

An approach of the present invention security related system and method may be based on the tools, programs and operating systems as discussed throughout this disclosure, such techniques can be applied to various hardware, tools, operating systems, virtual machine, PVM, or executable format.

The various embodiments of the present invention security system and method can be used in a wide variety of real-world situations to provide strong protection against attacks, as well other desired or required uses.

5. References

The following patents, applications and publications as listed below and throughout this document are hereby incorporated by reference in their entirety herein.

[i] Hiser, J. D., Davidson, J. W., Nguyen-Tuong, A., Co, M. Method of Fine-Grained Instruction Location Randomization (ILR) and Related System. Reference [i].

The devices, systems, algorithms, computer program products, computer readable medium, and methods of various embodiments of the invention disclosed herein may utilize aspects disclosed in the following references, applications, publications and patents and which are hereby incorporated by reference herein in their entirety (and which are not admitted to be prior art with respect to the present invention by inclusion in this section):

A. International Patent Application Serial No. PCT/US2006/026932, Davidson, et al., "Method and System for Software Protection Using Binary Encoding", filed Jul. 11, 2006; International Patent Application Publication No. WO 2007/008919, published Jan. 18, 2007.

B. U.S. patent application Ser. No. 11/995,272, Davidson, et al., "Method and System for Software Protection Using Binary Encoding", filed Feb. 29, 2008; U.S. Patent Application Publication No. US 2009/0144561, published Jun. 4, 2009.

C. International Patent Application No. PCT/US2008/087712, Davidson, et al., "System and Related Method for Protecting Software Via Continuous Anti-Tampering and Obfuscation Transforms", filed Dec. 19, 2008; International Patent Application Publication No. WO 2009/108245, published Sep. 3, 2009.

D. U.S. patent application Ser. No, 12/809,627, Davidson, et al., "Method and System for Software Protection Using Binary Encoding", filed Jun. 21, 2010; U.S. Patent Application Publication No. US 2011/0035601, published Feb. 10, 2011.

E. International Patent Application Serial No. PCT/US2013/027944, Hiser, et al., "Method of Instruction Location Randomization (ILR) and Related System," filed Feb. 27, 2013; International Patent Application Publication No. WO 2013/130548, published Sep. 6, 2013.

F. International Patent Application Serial No. PCT/US2013/070180, Nguyen-Tuong, et al., "Methods, Systems and Computer Readable Media for Detecting Command Injection Attacks," filed Nov. 14, 2013; International Patent Application Publication No. WO 2014/078585, published May 22, 2014.

G. U.S. patent application Ser. No. 14/381,464, Hiser, et al., "Method of Instruction Location Randomization (ILR) and Related System," filed Aug. 27, 2014.

Unless clearly specified to the contrary, there is no requirement for any particular described or illustrated activity or element, any particular sequence or such activities, any particular size, speed, material, duration, contour, dimension or frequency, or any particularly interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. It should be appreciated that aspects of the present invention may have a variety of sizes, contours, shapes, compositions and materials as desired or required.

In summary, while the present invention has been described with respect to specific embodiments, many modifications, variations, alterations, substitutions, and equivalents will be apparent to those skilled in the art. The present invention is not to be limited in scope by the specific embodiment described herein. Indeed, various modifications of the present invention, in addition to those described herein, will be apparent to those of skill in the art from the foregoing description and accompanying drawings. Accordingly, the invention is to be considered as limited only by the spirit and scope of the disclosure, including all modifications and equivalents.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application. For example, regardless of the content of any portion (e.g., title, field, background, summary, abstract drawing figure, etc.) of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Unless clearly specified to the contrary, there is no requirement for any particular described or illustrated activity or element, any particular sequence or such activities, any particular size, speed, material, dimension or frequency, or any particularly interrelationship of such elements. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all sub ranges therein. Any information in any material (e.g., a United States/foreign patent, United States/foreign patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

6. Description of Further Exemplary Embodiments 6.1 Introduction

This section of this document sets forth a modular technique for statically rewriting an input binary program or library using a novel reassembly technique that ensures the transformed output is compact and efficient. The method does not require compiler support, debug information or source code and it is compiler agnostic and applicable to both dynamically and statically linked programs and shared and static libraries. It is a pipeline of modular components that disassemble, analyze, transform and, ultimately, rewrite an original program or library into a compact transformed version with all the functionality of the original (unless that behavior is explicitly modified) and new functionality added through the application of user-specified transformations. A transformed program will have minimal overhead in on-disk size and execution speed. To demonstrate the feasibility of such a technique, we developed and evaluated a prototype implementation called Zipr.

The technique is generally suited to program optimization and transformation but particularly useful in software security, reliability and dependability. Because it is applied to a program's machine code, our method is complementary to static analysis, proof carrying code, etc. that protect and improve software through source code modification. User-defined transformations deployed through this method can improve or optimize COTS and proprietary programs even if the source code is unavailable or the developer is unable or unwilling to make changes.

Improvements may include additional sanitization of user input, error handling and crash reporting, patching security vulnerabilities, automatic introduction and enforcement of security policies, etc. Because our approach adds minimal overhead to a transformed program, it can be used to secure and improve software running on servers, desktops and even embedded systems where the size of the binary directly affects the economics of production (see Reference [6] below) and where security and dependability are critical (see Reference [3] below).

Using modular components, our approach constructs, analyzes and, optionally, transforms an intermediate representation (IR) of the original program/library.

An IR Construction phase takes an input program and disassembles it into an IR. A Transformation phase applies one or more user-specified transformations that programmatically alter the IR to modify the original behavior. A Reassembly phase converts this IR back into executable machine code using a novel technique for program reassembly that takes advantage of pinned addresses, locations of instructions in the original program/library that may be targeted indirectly at runtime (also known as indirect branch targets [IBTs]).

Accurate program disassembly is a prerequisite for completely identifying a program's pinned addresses. Although impossible in the general case (see Reference [13] below), our preliminary investigations indicate that identifying IBTs is feasible for programs generated by compilers. Our method uses a set of heuristics to analyze a binary program to identify pinned addresses (see Section 6.2.1). These heuristics recognize patterns in compiled assembly code that indicate an address that may be later selected as the destination of program control transfer. The technique's heuristics also handle a restricted class of computations that select an IBT from among an array of choices. However, it cannot handle self-referencing/modifying code or handwritten assembly code that makes unrestricted control flow transfers.

Under these conditions, a program/library transformed using this technique is able to rewrite binary programs without keeping a duplicate of the original program's instructions. The technique would have advantages over existing static binary rewriting techniques and could minimize the size of the modified program/library.

This work makes, e.g., the following contributions:
Introduction of a novel algorithm for rewriting binary programs and libraries that does not incur the space overhead of current binary rewriters.
Measurement of our prototype implementation's efficiency when applied to a set of industry-standard benchmarks.

The remainder of this section of this document is organized as follows: Section 6.2 describes the algorithm for statically rewriting a binary computer program. Section 6.3 presents the results of an evaluation of the overhead (in program size and execution speed) of a set of benchmark programs statically rewritten using Zipr, our prototype implementation. Section 6.4 discusses some of the open questions and limitations of this technique. Section 6.5 describes existing static binary rewriters and discusses their similarities to and differences with our work. Section 6.6 summarizes illustrative contributions of this work.

6.2 The Method

In some preferred embodiments, our rewriting method includes three phases: IR Construction, Transformation and Reassembly. See FIG. 12 showing the rewriting pipeline.

The IR Construction phase takes an input program, disassembles it into an IR, deduces pinned addresses, and prepares the IR for modification. The Transformation phase applies user-specified transforms that programmatically alter the IR to add new functionality to the program. The Reassembly phase converts the modified IR back into executable machine code using a novel technique for program reconstruction.

The IR database (IRDB) mediates communication among cooperating subcomponents. Depending on the task, subcomponents may read, write, or read and write the IRDB. The IRDB is an SQL-based system that "[stores] a variety of information about [a] binary obtained from different sources" (see Reference [5] below). Besides information traditionally represented by an IR (e.g., the control flow graph), the IRDB is designed to store information about the original and modified programs in a way that supports analysis and transformation. Section 6.2.1 describes how our approach populates the IRDB with information about the original program and explains the specific features of the IRDB used by Zipr.

6.2.1 IR Construction

The IR Construction phase consists of stages normally associated with "binary code analysis" (see Reference [9] below): disassembly and control flow graph (CFG) construction. The IR Construction phase begins with disassembly of the original program's instructions. Next, it constructs the original program's CFG and collects associated metadata. The results of both stages are stored in the IRDB for processing by the Transformation and Reassembly phases.

Disassembly Disassembly of a binary program, "[d]ecoding bytes into machine instructions" (see Reference [9] below), is not an easy task. A program may have overlapping instructions or non-code bytes may be interspersed among instructions (see Reference [9] below). Disassembly is even more difficult when the binary program does not contain symbols (see Reference [9] below).

Our rewriting algorithm does not require perfect disassembly but does rely on accurate disambiguation between code and data. Instructions and data are often mixed in jump tables or in code that computes on embedded, read-only data elements (see Reference [9] below). The problem is particularly difficult because bytes of data often decode into valid instructions (see Reference [9] below).

In the general case, given access only to a program's machine code, code/data disambiguation is not just difficult, it is impossible (see Reference [10] below). In practice, however, disambiguation between code and data is feasible but, again, not easy. And although there are many existing disassemblers that disambiguate code and data, none is perfect. Schwartz et al. give a good overview of two popular types of disassemblers and the techniques each uses to disambiguate code and data (see Reference [13] below). This work by Schwarz, et al. also exemplifies the research being done to improve disambiguation techniques, in particular, and disassembly techniques, in general (see Reference [13] below).

By virtue of our rewriting technique's modular design, our methodology is able to aggregate the output of multiple disassemblers. By aggregating the output of the disassemblers, our approach can take advantage of each tool's strengths and compensate for any weaknesses. Moreover, the modular design gives our methodology the flexibility to include the output of the new disassemblers built by researchers like Schwar$_2$ et al. In some examples, Zipr combines the output of objdump and IDA Pro.

There are four possible outcomes when disambiguating a range of bytes. The disassembler can:
1. correctly and conclusively label the range of bytes as data or instructions;
2. incorrectly but conclusively label the range of bytes as data;
3. ambiguously label the range of bytes;
4. incorrectly but conclusively label the range of bytes as instructions.

Case 1 obviously requires no special handling. Our rewriting technique handles Cases 2 and 3 conservatively. For Case 2, the range of bytes is labeled as data but is actually instructions. Our approach handles this case by treating the bytes as both data and instructions. We fix the bytes to their original address and use the decoded bytes as instructions for the purpose of CFG construction (see Section 6.2.1).

Case 3 is a byproduct of our rewriting technique's use of multiple disassemblers, as mentioned earlier. When a conclusive determination cannot be made about whether a range of bytes is code or data (i.e., the disassemblers disagree), our approach treats the bytes as both code and data and handles it as an instance of Case 2.

If Case 4 occurs, it is possible that our rewriting technique will generate a non-functioning transformed program. Therefore, it is critical that we be conservative in our analysis of disassemblers' outputs. If there is any chance that a range of bytes labeled instructions actually contains data, we treat the disassemblers' output as if it were inconclusive (Case 3). Even though our approach treats this case conservatively and, in most cases, correctly, Zipr also emits a warning to the user to make debugging easier in the case of failure.

Zipr targets programs generated by the GCC compiler. We chose to focus on this compiler because of its widespread use in both proprietary and open source software. Empirical results (see Section 6.3) show that Zipr can successfully transform complex programs generated by GCC. As evidence that our approach is not limited to a particular compiler, we successfully tested Zipr on programs generated with LLVM. That said, our technique is not restricted to programs generated by compilers; it can handle handwritten assembly code as long as instructions do not overlap or compute arbitrary jump targets.

Given the aforementioned caveats, our approach is able to rewrite programs in the most common cases. In support of rewriting, our methodology captures the following features of an instruction during the disassembly stage:
1. fallthrough instruction;
2. target, if it is a control flow instruction and the target is known statically; and
3. pinned address.

The fallthrough instruction is used for reassembling linear sequences of instructions and is null if the instruction is an unconditional program control instruction.

The target is used for correctly matching instructions that refer to one another by their addresses (see Section 6.2.2) and is only used if the instruction is a program control instruction whose target is static. An instruction's fallthrough and target instructions are stored in logical format which means that the relationships are independent of the original program's layout. Assignment of the pinned address is discussed next.

CFG Construction

Under the conservative assumption of perfect disassembly of a program's binary code, constructing a program's CFG from its machine code is still not a straightforward process. Meng, et al. present several cases where CFG construction is complicated even when accurate disassembly is possible: indirect control flow, non-return functions, functions that share code, non-contiguous functions and functions with tail calls (see Reference [9]). While each complicating factor must be managed and even the best of existing tools (e.g., IDA Pro) are not able to handle every case correctly (see Reference [9]), our technique assumes proper analysis of indirect control flow. Therefore, we focus our attention on this complicating factor.

Our technique uses pinned addresses, locations of instructions in the original program/library that may be targeted indirectly at runtime. Addresses of units of data are always pinned. On the other hand, the address, a, of an instruction, i, in the original program is pinned if the original program calculates dynamic program control references to a at runtime. In this case, a will be stored as the pinned address value of i. In other words, pinned address analysis depends directly on correct calculation of indirect control flow.

Addresses of instructions may be pinned for a number of reasons. Most commonly, however, addresses are pinned because they are the targets of indirect branches (IB). IB targets (IBTs) appear in jump tables, immediately after call instructions, the beginning of functions, etc. Just because program control reaches an instruction indirectly does not mean that its address must be pinned. There are cases where the program's behavior with respect to an IBT can be analyzed and modeled statically.

For our rewriting methodology to operate correctly it is not necessary to determine the set of possible targets for every particular indirect branch instruction. Our technique relies only on the fact that P, the set of all pinned addresses, contains at least all the addresses of IBTs in the original program. In other words, we rely on the creation of P such that $B \subseteq P$ where B is the set containing the addresses of every IBT from the original program.

It is possible to calculate P naively by making the address of every instruction of the original program a member. This assignment clearly satisfies the requirement. As discussed in Section 6.2.3, however, such an assignment does not give the reassembly technique the flexibility to re-place instructions. Moreover, it does not allow for the creation of an efficient rewritten binary program.

Ideally B=P. As |P−B| grows, our method generates an increasingly less space-efficient rewritten binary. Therefore, our algorithm leverages a set of heuristics that analyze the original program's CFG to select pinned addresses. Again, it is imperative that our technique be conservative; missing a pinned address will cause our rewriting algorithm to generate a transformed binary that does not operate correctly.

For a more detailed description of the algorithms used to identify pinned addresses of instructions and data, see Hiser, et al. (Reference [4] below) and Zhang, et al. (Reference [19] below).

For binaries generated by GCC, the target compiler of Zipr, our prototype implementation, we are able to handle very complex programs. Empirical evidence suggests that Zipr works for programs generated by LLVM as well.

Pinned addresses of instructions play an important role in reassembly. Throughout the rewriting algorithm, a pinned address, a, of an instruction in the original program corresponds to exactly one instruction, i. IR Construction assigns the original correspondence between a and i. During the Transformation phase, one or more transformations will change i to i' and a will still correspond to i'. For the modified program to function according to the semantics of the original program, as subsequently modified through user-specified transformations, when the transformed program's program counter (PC) reaches address a, instruction i' must be executed. Section 6.2.3 discusses the Reassembly phase which maintains this condition.

FIG. 13 shows an example of this process. Instruction i is associated with pinned address a. The Pad Stack transformation modifies i so it allocates a larger stack. The modified instruction, i', is still associated with a. When i' is eventually placed at address 0x30A3 in the modified program, the reference at a is updated appropriately.

6.2.2 Transformation

The Transformation phase modifies the original program's IR. User-specified transforms are optional transformations that modify or add/remove functionality to/from the original program. Mandatory transforms make it possible for the user-specified transforms to modify the original program's IR without regard for the details of the specific target platform. Mandatory Transformations Mandatory transformations in the Transformation phase produce a modified IR that makes it possible for the reassembly algorithm to place recreated instructions arbitrarily in the modified program's address space.

Mandatory transformations most commonly address issues with the target platform and its ISA. For example, many x86 instructions can use PC-relative addressing. The jump instruction is one such instruction.

Assume instruction $i_1$ transfers control to $i_2$ with a jump. On an x86, $i_1$ is a jump to $a_{i2}$ the address of $i_2$. However, $a_{i2}$ is encoded in $i_1$ relative to $a_{i1}$. To be able to relocate instructions, relationships like these that rely on the instructions' addresses in the original program have to be translated into logical links. Fortunately, the IR is built using logical connections among instructions. Returning to the example, the IR links $i_1$ to $i_2$, not $a_{i2}$. Memory operations (loads and stores) may also be PC-relative.

Unless this situation is handled, PC-relative instructions' placement in the modified program at different addresses will cause an error during execution of the modified program. Each target platform's ISA is different and our method's modular approach makes it possible for the user to apply as many mandatory transformations as necessary to accommodate the target platform. Zipr includes all the required mandatory transformations for the x86 and x86-64 platforms.

User-Specified Transformations

Once all the mandatory transformations are applied, our technique applies any user-specified transformations. These are transformations that the user implements that will modify the original program. As mentioned earlier, there are many ways a user could modify the original program to improve its security, reliability and dependability. Instead of forcing the user to choose from a set of predefined transformations, Zipr provides the user an API to develop their own. The API allows the user to iterate through the functions and instructions of the original program. Users can change (modify or replace) or remove instructions. They can even add new instructions or specify how to link in pre-compiled program code and execute functions therein.

6.2.3 Reassembly

At the heart of our approach's novel reassembly technique is an algorithm that carefully reassembles the modified IR into a series of instructions and units of data which are then assigned a location in the modified program's address space.

The process begins by creating references in the modified program at the pinned addresses from the original program. These references target a pinned address' associated instruction or unit of data, as explained in 6.2.1. The targets of those references (and their fallthrough instructions) are placed arbitrarily in the remaining free space and the references are marked as resolved. In the process of resolving the initial set of references, new unresolved references may be introduced. The targets of those references are again placed arbitrarily in the remaining free space and the references are resolved. The process continues until there are no more unresolved references.

Figure 14:
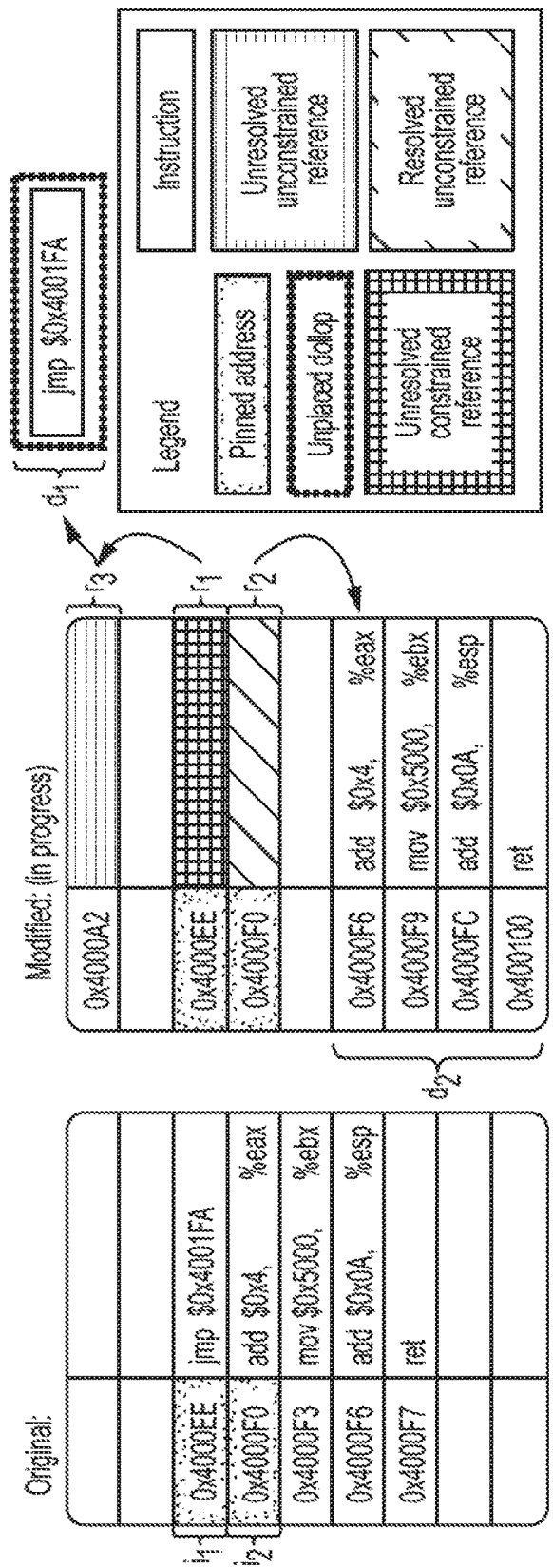
FIG. 14 illustrates an internal state of an algorithm as it reassembles a program according to some illustrative embodiments of the invention.

FIG. 14 illustrates the internal state of the algorithm as it reassembles a program. The following subsections explain the reassembly algorithm in detail.

Initial Reference Placement

At the outset, the modified program's text segment is empty. The data segment is copied directly from the original program. The reassembly algorithm begins by placing unresolved constrained references at pinned addresses.

A reference is a link to data or instructions in a dollop. A dollop is a linear sequence of instructions linked by their fallthroughs. References are unresolved when they link to data or dollops in IR form. When a dollop is reconstructed from its IR into instructions and assigned a location in the modified program's address space, references are resolved to those particular addresses. In FIG. 14, $r_1$, $r_2$ and $r_3$ are references. $r_1$ and $r_2$ are resolved and $r_3$ is unresolved.

A reference is constrained when there is a restriction on where its target may be placed within the modified program's address space. Because a reference includes an address (its target), the implementation of the reference itself must be at least as large as the encoding of that address. The size available for encoding the address may be limited when the addresses of two adjacent instructions are pinned.

In FIG. 14, there is a 2-byte instruction $i_1$ at 0x4000EE and a 3-byte instruction $i_2$ at 0x4000F0 and both have pinned addresses. The reference to the transformed instruction $i'_1$ will have to encode the instruction's address when it is placed. No matter how the ISA encodes addresses (relative or absolute), the encoding cannot exceed two bytes without interfering with the reference at the adjacent pinned address. If the ISA does not support addressing the full address space in two bytes, the reference at 0x4000EE must be constrained.

Reference Expansion and Chaining

Once a constrained unresolved dollop reference is placed at each pinned address, the reassembly algorithm determines which references can be unconstrained. Depending upon the ISA of the implementation target, there is a minimum size, s, necessary to store an instruction that addresses the entire address space. If the space between adjacent constrained unresolved references $r_1$ and $r_2$ is greater than s, our algorithm converts $r_1$ to an unconstrained unresolved reference. In FIG. 14, $r_2$ would initially have been a constrained unresolved reference but has been converted to an unconstrained unresolved reference because there are no pinned addresses in [0x4000F0, 0x4000F0+s).

For every remaining constrained unresolved reference, r, that references instruction i, a new unresolved unconstrained dollop reference, r', is added in the modified program's address space. r is resolved to r' through one or more intermediate references and r' is set to reference i. This is a process known as chaining (see Reference [7] below). In FIG. 14, $r_1$ is a reference to $d_1$ that is chained through $r_3$.

Reference Resolution and Instruction Placement

At this stage of the reassembly, all unresolved references are unconstrained. Besides the information from the IRDB, the reassembly algorithm relies on three data structures:

uDR: The list of unresolved references,
D: A list of unplaced dollops (this list is initially empty),
M: A mapping between instructions and their location in the modified program's address space.

The final stage of the reassembly algorithm is iterative: Every unresolved reference, $r_u$, to instruction i in list uDR is considered in turn until the list is empty.

Reference $r_u$ is handled in one of two ways. Either i is already placed in the modified program's address space or it is not. In the former case, the reassembly algorithm simply emits a resolved unconstrained reference to M[i]. $r_u$ is removed from uDR and the loop continues. The latter case is more involved—a dollop containing i must be retrieved or constructed and then placed. The reassembly algorithm searches D for d, the dollop containing i.

If no dollop is found, the reassembly algorithm constructs a dollop that contains i. The dollop construction process is straightforward. Dollop d begins with instruction $i_0$ and includes $i_0$'s fallthrough $i_1$, $i_1$'s fallthrough $i_2$, and so on. The last instruction in d, $i_n$, is the first instruction that has no fallthrough. The reassembly algorithm places the instructions of d linearly in a consecutive block of addresses. In FIG. 14, $d_2$ is a placed dollop.

When there is no block of free space big enough to accommodate the instructions of d, the dollop may be split. Furthermore, large dollops may be split to fill small blocks of free space. Dollop d of instructions $i_1 \ldots i_s \ldots i_n$ is split by choosing a split point, $i_s$. Dollop d is truncated to contain instructions $\{i_1 \ldots i_{s-1}\}$ and d' is built to contain instructions $\{i_s \ldots i_n\}$. An unconstrained unresolved reference r that references $i_s$ is appended to the end of d. The unresolved reference r is added to uDR and d' is added to D.

After d is placed, $r_u$ is resolved and the map M is updated for all instructions in d. Any other unresolved references that target instructions in d are resolved as well. In FIG. 14, $r_2$ is resolved to $d_2$.

An instruction $i_1$ in the just-placed dollop d may reference another instruction, $i_2$. If $i_2$ is already placed, that reference is resolved immediately. Otherwise, an unresolved reference $r_2$ is created that references $i_2$ and $r_2$ is added to uDR.

The modified program is completely reassembled when uDR is empty.

Example

Again, FIG. 14 illustrates these concepts in the context of an program being reassembled. In this example we will describe Zipr, the prototype implementation of our technique for the x86 ISA where there are variable length instructions. A jump—the implementation of references for this target—can be as short as two bytes (program control transfer is constrained to nearby locations) and as long as have (program control can be transferred anywhere in the program).

In this example, there are two pinned addresses, two dollops and three references. Dollop $d_2$ is already placed; dollop $d_1$ is not. Reference $r_1$ began as a constrained unresolved reference to an instruction in dollop $d_1$. For expository purposes, assume that $d_1$ could not be placed at an address that is addressable in 2 bytes from $r_1$. Jump chaining was used and reference $r_1$ was resolved to $r_3$ and $r_3$ became an unresolved unconstrained reference to the instruction in $d_1$.

Because dollop $d_2$ is already placed, reference $r_2$ is resolved. Reference $r_2$ began as a constrained reference but because there were no pinned addresses in [0x4000F0, 0x4000F5), $r_2$ was converted to an unconstrained reference.

6.3 Additional References

Each of the references in the following list of additional references is hereby incorporated by reference in its entirety herein:

1. Anand, K., Smithson, M., Kotha, A., Elwazeer, K., Barua, R.: Decompilation to compiler high IR in a binary rewriter. Tech. rep., University of Maryland (November 2010), http://www.ece.umd.edu/~barua/high-IR-technical-report10.pdf 2. Bruening, D., Garnett, T., Amarasinghe, S.: An infrastructure for adaptive dynamic optimization. In: Proceedings of the international Symposium on Code Generation and Optimization: Feedback-directed and Runtime Optimization. pp. 265-275. CGO '03, IEEE Computer Society, Washington, D.C., USA (2003).

3. Halperin, D., Heydt-Benjamin, T. S., Fu, K., Kohno, T., Maisel, W. H.: Security and privacy for implantable medical devices. IEEE Pervasive Computing 7(1), 30-39 (2008).

4. Hiser, J. D., Nguyen-Tuong, A., Co, M., Hall, M., Davidson, J. W.: ILR: Where'd my gadgets go? In: Proceedings of the 2012 IEEE Symposium on Security and Privacy. pp. 571-585. SP '12, IEEE Computer Society, Washington, D.C., USA (2012).

5. Hiser, J. D., Nguyen-Tuong, A., Co, M., Rodes, B., Hall, M., Coleman, C. L., Knight, J. C., Davidson, J. W.: A framework for creating binary rewriting tools (short paper). In: Proceedings of the 2014 Tenth European Dependable Computing Conference. pp. 142-145, EDCC '14, IEEE Computer Society, Washington, D.C., USA (2014).

6. Edler von Koch, T. J., Franke, B., Bhandarkar, Dasgupta, A.: Exploiting function similarity for code size reduction. SIGPLAN Not. 49(5), 85-94 (June 2014).

7. Leverett, B. W., Szymanski, T. G.: Chaining span-dependent jump instructions. ACM Trans. Program. Lang. Syst. 2(3), 274-289 (July 1980).

8. Luk, C., Cohn, R., Muth, R., Patil, H., Klauser, A., Lowney, G., Wallace, S., Reddi, V. J., Hazelwood, K.: Pin: Building customized program analysis tools with dynamic instrumentation. In: Proceedings of the 2005 ACM SIGPLAN Conference on Programming Language Design and Implementation. pp. 190-200. PLDI '05, ACM, New York, N.Y., USA (2005).

9. Meng, X., Miller, B. P.: Binary code is not easy. Tech. rep., University of Wisconsin, ftp://ftp.cs.wisc.edu/paradyn/papers/Meng15Parsing.pdf.

10. Prasad, M., Chiueh, T.: A binary rewriting defense against stack based buffer overflow attacks. In: Proceedings of the General Track: 2003 USENIX Annual Technical Conference. pp. 211-224 (2003).

11. Rodes, B. D., Nguyen-Tuong A., Hiser, J. D., Knight, J. C., Co, M., Davidson, J. W.: Defense against stack-based attacks using speculative stack layout transformation. In: Qadeer, S., Tasiran, S. (eds.) Runtime Veri_cation, Lecture Notes in Computer Science, vol. 7687, pp. 308-313. Springer Berlin Heidelberg (2013).

12. Romer, T., Voelker, G., Lee, D., Wolman, A., Wong, W., Levy, H., Bershad, B., Chen, B.: Instrumentation and optimization of Win32/Intel executables using etch. In: Proceedings of the USENIX Windows NT Workshop. NT'97, USENIX Association, Seattle, Wash. (August 1997).

13. Schwarz, B., Debray, S., Andrews, G.: Disassembly of executable code revisited. In: Proceedings Ninth Working Conference on Reverse Engineering (WCRE) 2002. pp. 45-54 (2002).

14. Scott, K., Kumar, N., Velusamy, S., Childers, B., Davidson, J. W., Soffa, M. L.: Retargetable and reconfigurable software dynamic translation. In: Proceedings of the international Symposium on Code Generation and Optimization: Feedback-directed and Runtime Optimization. pp. 36-47. CGO '03, IEEE Computer Society, Washington, D.C., USA (2003).

15. Smith, J., Nair, R.: Virtual Machines: Versatile Platforms for Systems and Processes (The Morgan Kaufmann Series in Computer Architecture and Design). Morgan Kaufmann Publishers Inc., San Francisco, Calif., USA (2005).

16. Srivastava, A., Edwards, A., Vo, H.: Vulcan: Binary transformation in a distributed environment. Tech. Rep. MSR-TR-2001-50, Microsoft Research (April 2001).

17. Van Put, L., Chanet, D., De Bus, B., De Sutter, B., De Bosschere, K.: DIABLO: A reliable, retargetable and extensible link-time rewriting framework. In: Proceedings of the Fifth IEEE International Symposium on Signal Processing and Information Technology, 2005. pp. 7-12 (December 2005).

18. Wartell, R., Mohan, V., Hamlen, K. W., Lin, Z.: Securing entrusted code via compiler-agnostic binary rewriting. In: Proceedings of the 28th Annual Computer Security Applications Conference. pp. 299-308. ACSAC '12, ACM, New York, N.Y., USA (2012).

19. Zhang, M., Qiao, R., Hasabnis, N., Sekar, R.: A platform for secure static binary instrumentation. In: Proceedings of the 10th ACM SIGPLAN/SIGOPS International Conference on Virtual Execution Environments. pp. 129-140. VEE '14, ACM, New York, N.Y., USA (2014).

Broad Scope the Invention

Unless clearly specified to the contrary, there is no requirement for any particular described or illustrated activity or element, any particular sequence or such activities, any particular size, speed, material, duration, contour, dimension or frequency, or any particularly interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. It should be appreciated that aspects of the present invention may have a variety of sizes, contours, shapes, compositions and materials as desired or required.

In summary, while the present invention has been described with respect to specific embodiments, many modifications, variations, alterations, substitutions, and equivalents will be apparent to those skilled in the art. The present invention is not to be limited in scope by the specific embodiment described herein. Indeed, various modifications of the present invention, in addition to those described herein, will be apparent to those of skill in the art from the foregoing description and accompanying drawings. Accordingly, the invention is to be considered as limited only by the spirit and scope of the disclosure, including all modifications and equivalents.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application. For example, regardless of the content of any portion (e.g., title, field, background, summary, abstract, drawing figure, etc.) of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Unless clearly specified to the contrary, there is no requirement for any particular described or illustrated activity or element, any particular sequence or such activities, any particular size, speed, material, dimension or frequency, or any particularly interrelationship of such elements. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all sub ranges therein. Any information in any material (e.g., a United States/foreign patent, United States/foreign patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

What is claimed is:

1. A method, comprising:
    using a representation of a computer software program;
    using identified addresses which correspond to a part of the representation; and
    converting the representation into a created binary program, which includes reserving spaces at the identified addresses in the created binary program's address space at the same addresses as the identified addresses in the representation,
    wherein space reserved from spatially nearby identified addresses is coalesced.

2. The method of claim 1, wherein the identified addresses are addresses of indirect branch targets.

3. The method of claim 2, wherein another method is used for rewriting some indirect branches or indirect branch targets.

4. The method of claim 1, wherein the identified addresses are an approximation of indirect branch targets.

5. The method of claim 4, wherein another method is used for rewriting some indirect branches or indirect branch targets.

6. The method of claim 1, wherein the representation is created by analyzing a computer software program.

7. The method of claim 6, wherein the analyzing is disassembling a computer software program.

8. The method of claim 6, wherein the created binary program does not include at least a portion of a copy of code from the computer software program.

9. The method of claim 6, wherein the created binary program does not include an entire copy of code from the computer software program.

10. The method of claim 1, wherein the identified addresses are generated by analyzing a computer software program or the representation of a computer software program.

11. The method of claim 10, wherein the analyzing includes scanning for indirect branch targets.

12. The method of claim 1, wherein the representation is modified by applying a transformation of the representation that modifies the representation.

13. The method of claim 1, wherein the space reserved is used to transfer control to the corresponding part of the representation.

14. The method of claim 1, wherein the space reserved is used to directly represent the corresponding part of the representation.

15. The method of claim 1, wherein a portion or all of the data of the computer software program is included in the created binary program.

16. The method of claim 1, wherein the created binary program does not include at least a portion of a copy of code from another analyzed binary program.

17. The method of claim 1, wherein the created binary program does not include an entire copy of code from another analyzed binary program.

18. The method of claim 1, wherein the space is reserved at all of the identified addresses.

19. The method of claim 1, wherein the space is reserved at only some of the identified addresses.

20. The method of claim 1, wherein the space reserved is used to put a sequence of bytes, where each address in the coalesced reserved space, when executed by a processor, will cause machine state to be different than if a different address executed.

21. The method of claim 20, wherein the differences in machine state are predictable to the system that produces the created binary program.

22. The method of claim 20, wherein machine state differences are used to execute the corresponding part of the representation.

23. The method of claim 20, wherein the sequence of bytes, when executed, will cause the machine state to be modified, then the machine state will be reverted to its unmodified state.

24. The method of claim 1, where the representation of a program includes one or more of the following: a compiler-style intermediate representation, a binary software program, bytecodes, a control flow graph, a call graph, a data dependence graph, a static single assignment representation, a 3-operand intermediate representation.

* * * * *